US008560722B2

(12) United States Patent
Gates et al.

(10) Patent No.: US 8,560,722 B2
(45) Date of Patent: Oct. 15, 2013

(54) SYSTEM AND METHOD TO GOVERN SENSITIVE DATA EXCHANGE WITH MOBILE DEVICES BASED ON THRESHOLD SENSITIVITY VALUES

(75) Inventors: Stephen Carl Gates, Redding, CT (US); Youngja Park, Edgewater, NJ (US); Josyula R. Rao, Briarcliff Manor, NY (US); Wilfried Teiken, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 13/051,679

(22) Filed: Mar. 18, 2011

(65) Prior Publication Data

US 2012/0240238 A1 Sep. 20, 2012

(51) Int. Cl.
G06F 15/16 (2006.01)

(52) U.S. Cl.
USPC ............. 709/232; 726/13; 726/14; 726/26; 725/25; 725/28; 725/105; 725/115; 725/116; 725/143; 725/146; 707/631; 707/702

(58) Field of Classification Search
USPC .......................................................... 726/26
See application file for complete search history.

(56) References Cited

U.S. PATENT DOCUMENTS

| 6,438,585 | B2 | 8/2002 | Mousseau et al. | |
|---|---|---|---|---|
| 6,865,426 | B1* | 3/2005 | Schneck et al. | 700/9 |
| 7,304,570 | B2 | 12/2007 | Thomas et al. | |
| 7,325,019 | B2 | 1/2008 | Lam et al. | |
| 7,346,778 | B1 | 3/2008 | Guiter et al. | |
| 7,490,356 | B2 | 2/2009 | Lieblich et al. | |
| 7,814,319 | B2* | 10/2010 | Iwasaki | 713/166 |
| 2006/0130118 | A1* | 6/2006 | Damm | 725/135 |
| 2006/0184549 | A1* | 8/2006 | Rowney et al. | 707/100 |
| 2006/0209770 | A1 | 9/2006 | Monaco et al. | |
| 2007/0149179 | A1 | 6/2007 | Kashiwabara | |
| 2007/0157310 | A1* | 7/2007 | Kondo et al. | 726/22 |

(Continued)

FOREIGN PATENT DOCUMENTS

EP 2197227 6/2010

OTHER PUBLICATIONS

H. Lieberman, "Letizia: An agent that assists web browsing," In Mellish, C.S., ed., Proceedings of the Fourteenth International Joint Conference on Artificial Intelligence, San Mateo, CA: Morgan Kaufmann, 924-929 (1995).

(Continued)

*Primary Examiner* — Nathan Flynn
*Assistant Examiner* — Bryan Wright
(74) *Attorney, Agent, or Firm* — Anne V. Dougherty; Michael J. Chang, LLC

(57) ABSTRACT

Techniques for limiting the risk of loss of sensitive data from a mobile device are provided. In one aspect, a method for managing sensitive data on a mobile device is provided. The method includes the following steps. A sensitivity of a data item to be transferred to the mobile device is determined. It is determined whether an aggregate sensitivity of data items already present on the mobile device plus the data item to be transferred exceeds a current threshold sensitivity value for the mobile device. If the aggregate sensitivity exceeds the current threshold sensitivity value, measures are employed to ensure the aggregate sensitivity remains below the current threshold sensitivity value for the mobile device. Otherwise the data item is transferred to the mobile device.

32 Claims, 12 Drawing Sheets

(56) References Cited

U.S. PATENT DOCUMENTS

| | | |
|---|---|---|
| 2008/0195474 A1* | 8/2008 | Lau et al. .................. 705/14 |
| 2009/0119745 A1 | 5/2009 | Chung et al. |
| 2009/0150970 A1 | 6/2009 | Hinds et al. |
| 2009/0208142 A1 | 8/2009 | Treadwell et al. |
| 2010/0015956 A1* | 1/2010 | Qu et al. ................ 455/414.1 |
| 2010/0048167 A1 | 2/2010 | Chow et al. |
| 2010/0199042 A1 | 8/2010 | Bates et al. |
| 2010/0242086 A1 | 9/2010 | Adams et al. |

OTHER PUBLICATIONS

M. Claypool et al., "Inferring User Interest," Internet Computing, IEEE, vol. 5, No. 6, pp. 32-39 (Nov./Dec. 2001).

E. Bier et al., "The Rules of Redaction: Identify, Protect, Review (and Repeat)," Security & Privacy, IEEE, vol. 7, No. 6, pp. 46-53 (Nov.-Dec. 2009).

* cited by examiner

SYSTEM OVERVIEW

MOBILE DEVICE AND DEVICE STATUS TRACKER DETAILS

DATA SENSITIVITY DETERMINATION AND POLICY DECISION DETAILS

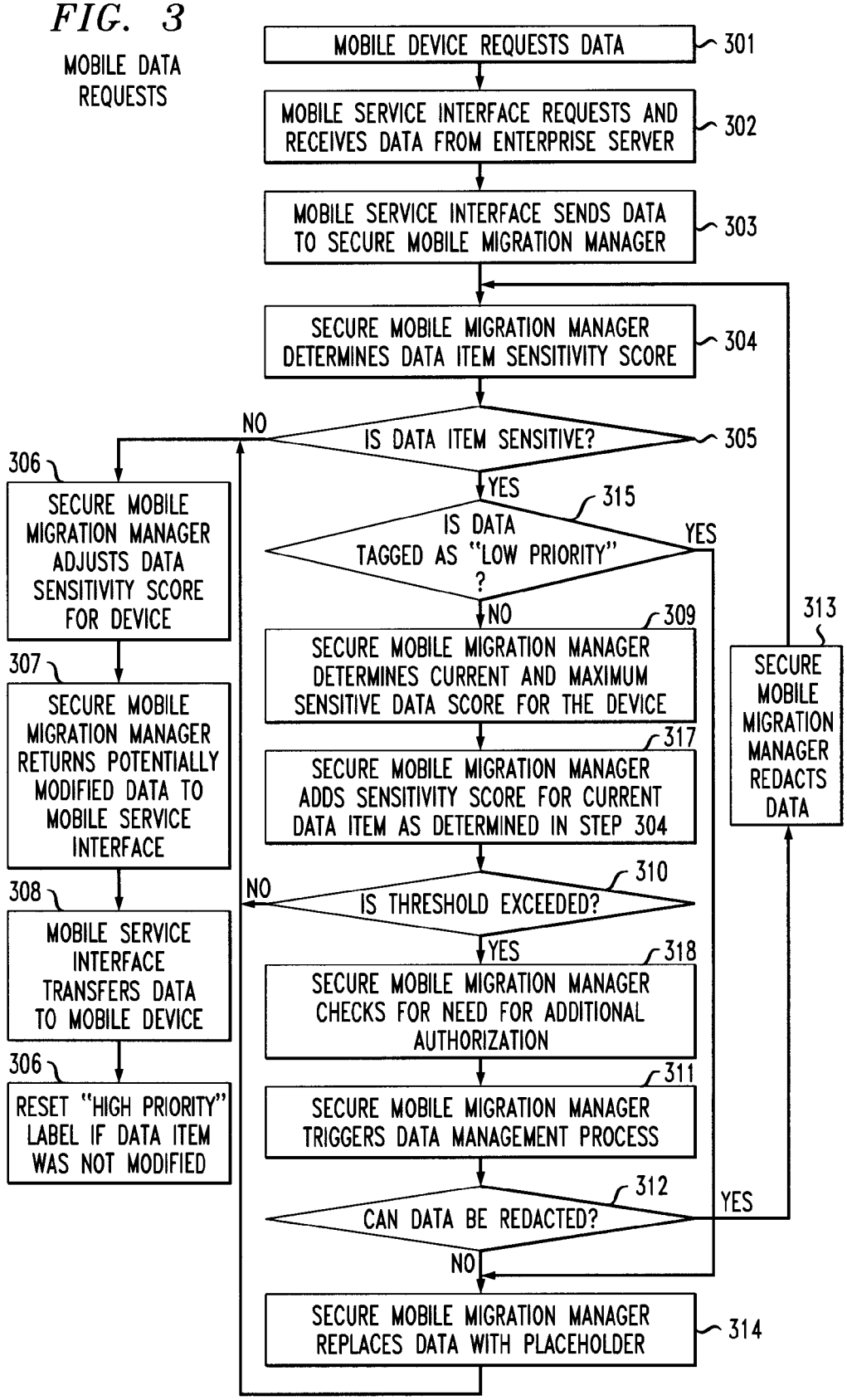

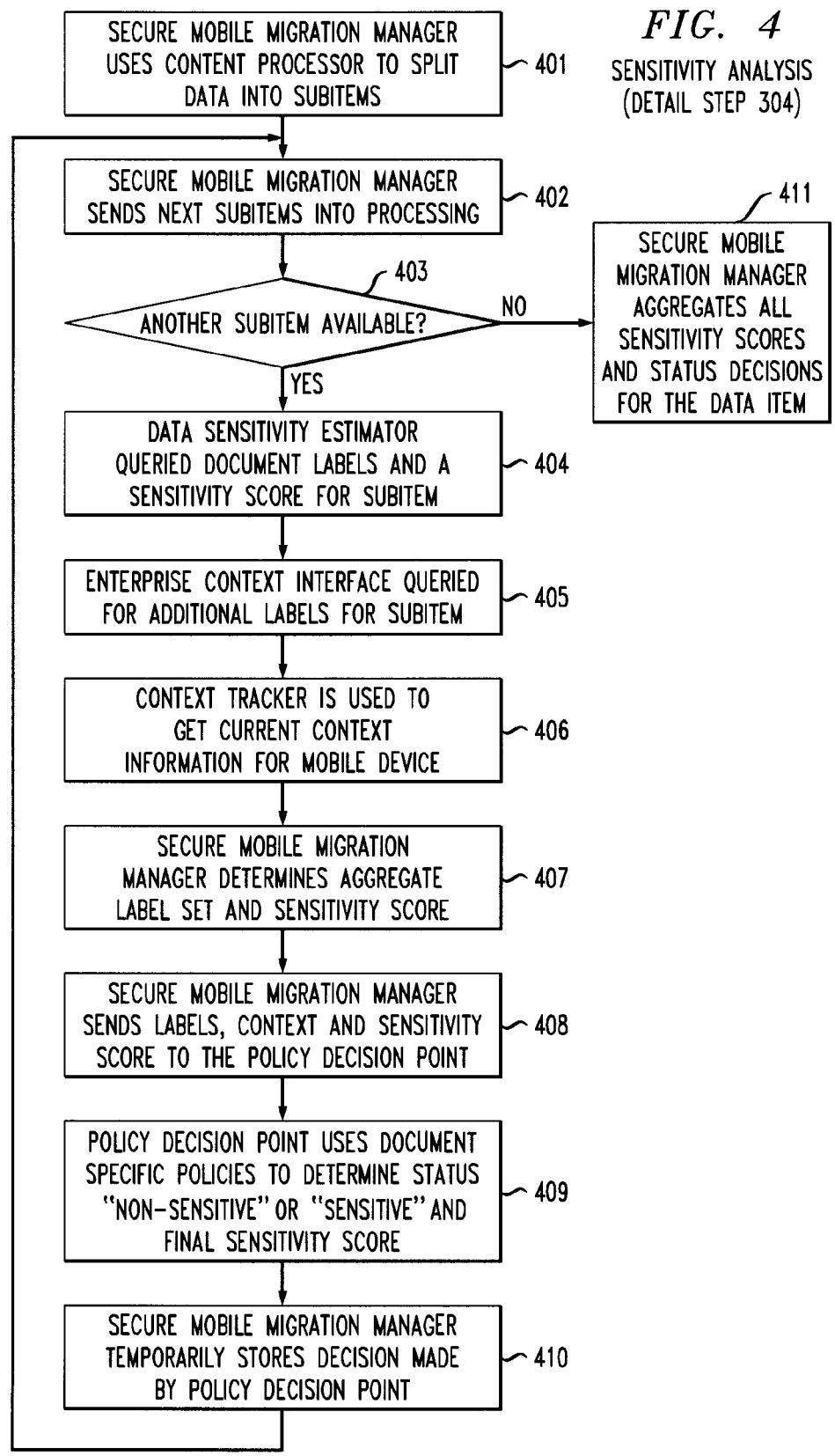

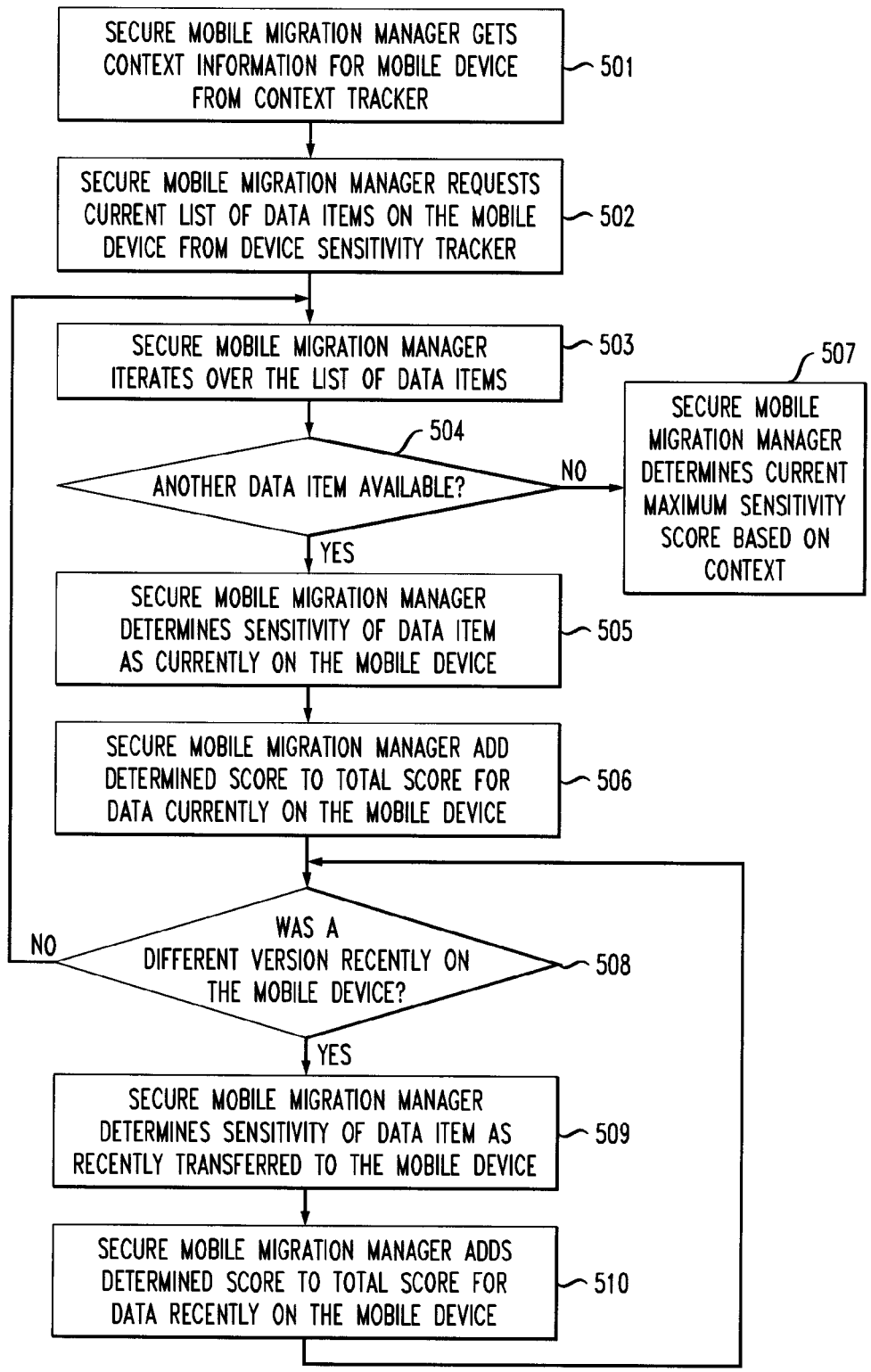

SENSITIVE DATA MANAGEMENT PROCESS

MONITORING TRANSMIT OPPORTUNITY FOR HIGH PRIORITY DATA ITEMS

SYSTEM AND METHOD TO GOVERN SENSITIVE DATA EXCHANGE WITH MOBILE DEVICES BASED ON THRESHOLD SENSITIVITY VALUES

FIELD OF THE INVENTION

The present invention relates to data exchange with mobile devices and more particularly, to data exchange techniques that limit the risk of loss of sensitive data from a mobile device.

BACKGROUND OF THE INVENTION

Over the last few years work environments have been changing from an office-centric model to an increasingly mobile model in which employees access enterprise data remotely through various channels from a wide range of devices. In addition to access from laptops that are connected to the enterprise network through encrypted channels such as virtual private networks (VPNs), employees increasingly use other mobile devices like smartphones or tablet computers. All mobile devices create a significant risk of data loss as the device is prone to accidental loss and theft, but especially mobile phones are at risk since employees typically carry them along during most of the day to be reachable, even in situations where other mobile devices like laptops are not typically carried.

These security concerns are particularly severe in environments where users want to use their personal mobile devices for business purposes. Under these circumstances, there is no guarantee that corporate safeguards and security practices are enforced.

Current solutions for dealing with the increased data loss risk on hand-held mobile devices include blocking of synchronization of certain files wherein the synchronization of certain files is blocked based on criteria like document format. See, for example, U.S. Pat. No. 6,438,585 issued to Mousseau et al., entitled "System and Method for Redirecting Message Attachments Between a Host System and a Mobile Data Communication Device" and U.S. Patent Application Publication No. 2010/0242086 filed by Adams et al., entitled "System and Method for Handling Data Transfers." This could prevent certain files from being exposed in case the device is lost, but this technique creates a conflict between the usability of the device (i.e., having all relevant documents accessible) and the minimization of loss risk (i.e., keeping sensitive documents off of the device). There usually is no solution that satisfies both interests.

Current solutions for dealing with the increased data loss risk on hand-held mobile devices also include encryption of the data stored on the device wherein devices encrypt the stored information, thus preventing access to sensitive information in case the device is lost. This technology has several drawbacks. Namely, the encryption key itself has to be stored on the device, usually protected by a PIN code or password that has to be entered to use the mobile device. For usability reasons this code is often limited in complexity since it has to be frequently entered, and it will typically only be required after a certain timeout period. If the device is stolen after the PIN code or password was entered by a legitimate user but before the timeout occurs the perpetrator can access all data on the device, and often even prevent the PIN code or password timeout by simply using the device continuously since the timeout is typically linked to the device being inactive. Existing platforms may also allow circumvention of the encryption based on errors in the encryption implementation or based on hardware attacks against the platform. This was demonstrated in the past for multiple mobile phone platforms.

Current solutions for dealing with the increased data loss risk on hand-held mobile devices also include remote wipes in case of loss. This technology allows remote wipes (and in addition also often remote locking) of the device. In case the device is stolen this function can prevent data from unauthorized access by deleting all data from the device and securely erasing the storage. The major drawback of this method is that it only helps if three conditions are all met: the owner has to realize the device is missing, the owner has to be able to report the loss (i.e., he cannot use the lost device to report the loss) and the device has to be connected to a wireless network to receive the remote wipe command and be able to execute it. Some platforms also allow a timed remote wipe if the device is off of the network for a pre-defined amount of time, but if the defined interval is long enough to not interfere with occasional network outages the time until the wipe occurs may still be long enough to steal all data on the device.

None of the existing technologies offers a satisfying way to manage the risk connected to the data on the mobile device based on the drawbacks listed for the main protection technologies. Thus, improved techniques for minimizing the risk of loss of sensitive data from mobile devices would be desirable

SUMMARY OF THE INVENTION

The present invention provides techniques for limiting the risk of loss of sensitive data from a mobile device. In one aspect of the invention, a method for managing sensitive data on a mobile device is provided. The method includes the following steps. A sensitivity of a data item to be transferred to the mobile device is determined. It is determined whether an aggregate sensitivity of data items already present on the mobile device plus the data item to be transferred exceeds a current threshold sensitivity value for the mobile device. If the aggregate sensitivity exceeds the current threshold sensitivity value, measures are employed to ensure the aggregate sensitivity remains below the current threshold sensitivity value for the mobile device. Otherwise the data item is transferred to the mobile device.

A more complete understanding of the present invention, as well as further features and advantages of the present invention, will be obtained by reference to the following detailed description and drawings.

BRIEF DESCRIPTION OF THE DRAWINGS

FIG. 3 is a diagram illustrating the process executed when data is transferred to the Mobile Device, either based on a request by the Mobile Device or in a push process initiated by an enterprise component according to an embodiment of the present invention;

FIG. 4 is a diagram giving additional detail on the sensitivity analysis of a data item that might be sent to the Mobile Device according to an embodiment of the present invention;

FIG. 5 is a diagram illustrating the determination of the current device sensitivity score (i.e., the aggregation of the sensitivity of all data items on the mobile device) according to an embodiment of the present invention;

DETAILED DESCRIPTION OF PREFERRED EMBODIMENTS

Provided herein are techniques to actively manage the amount of sensitive information stored on a mobile device based on the sensitivity of the information itself, enterprise policies, current user need and anticipated device loss probability. The present techniques reduce the data loss risk related to a mobile device.

The present techniques improve the existing art by actively managing the amount of sensitive information on the mobile device to minimize the risk of data loss due to theft or loss of the device. Managing the amount of sensitive information means to dynamically change the set of sensitive data items on the mobile device based on the context of the device (i.e., the relative risk of the current environment for loss) and the context of the user (i.e., the current need of the user for sensitive information). In a risky environment (e.g., an airport or train station) the amount of sensitive information allowed on the device should be minimal. In a safe environment (e.g., at home or in the office) a larger amount of sensitive information on the device is acceptable. The level (e.g., the method or number of different methods) of authentication required by the device may also be dynamically adjusted by the device to achieve an appropriate balance of usability and loss risk related to the mobile device given the current context and its associated risk.

Figure 1:
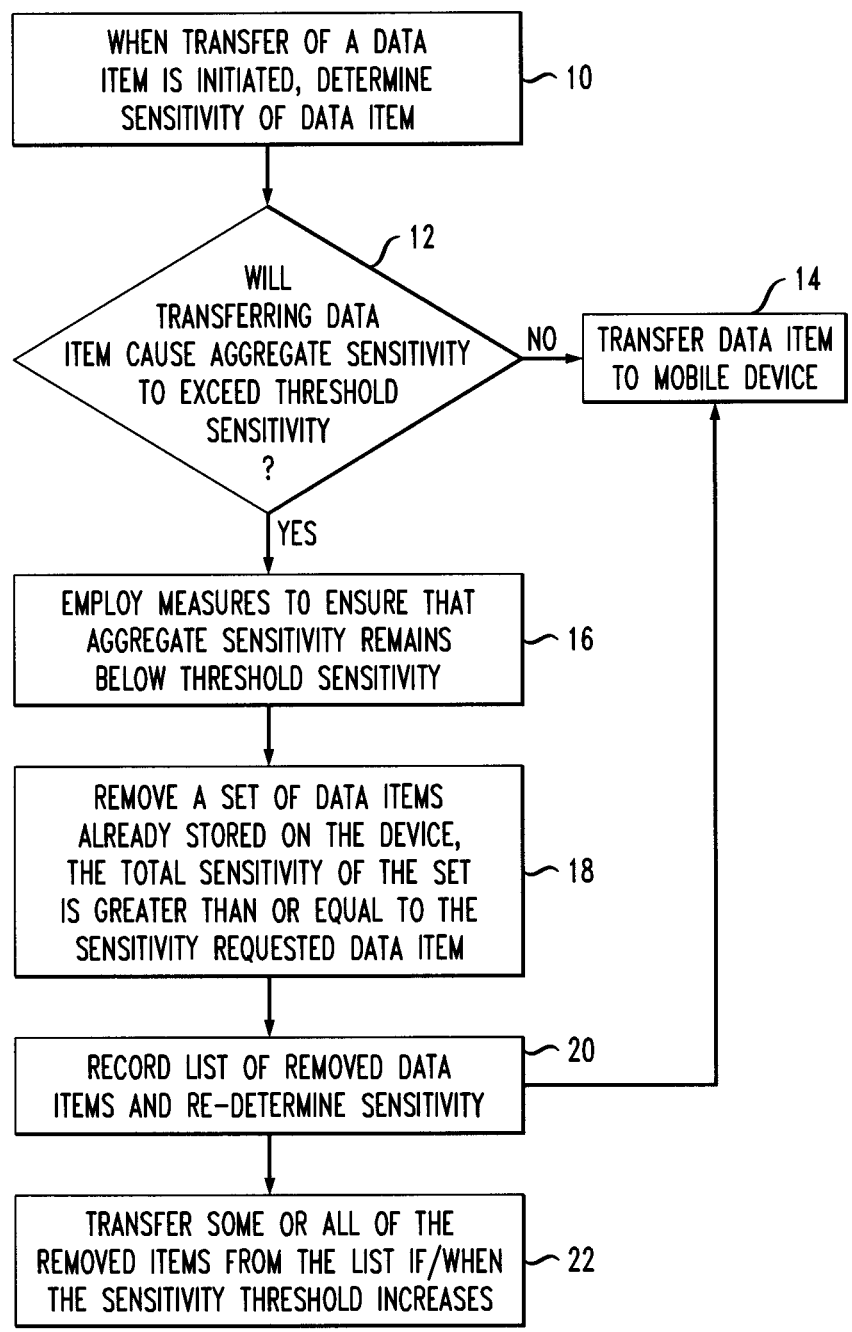
FIG. 1 is a diagram illustrating an exemplary methodology for managing sensitive data on a mobile device according to an embodiment of the present invention.

In order to achieve these features, the present techniques modify the Mobile Service Interface that allows access from the mobile device to specific enterprise resources, typically realized as a synchronization process. See, for example, FIG. 1. FIG. 1 is a diagram illustrating an exemplary methodology 100 for managing sensitive data on a mobile device. FIG. 1 provides an overview of the techniques presented herein. In step 10, when the transfer of a data item is initiated (e.g., when a user of the device requests the data item) and/or when a new data item is available for the mobile device (for example, in a push email system), the sensitivity of the data item is determined. Techniques for determining the sensitivity of a data item are provided below. In step 12, a determination is made as to whether sending this data item is acceptable with respect to a policy governing the total amount of sensitive information currently allowed to be stored on the device given the current user and his context (e.g., location and/or time of day). Namely, according to an exemplary embodiment, an aggregated sensitivity of all of the data currently on the device due to previous data requests plus the requested data is measured. The total or maximum amount of sensitive information allowed on the device at any given time is represented by a threshold sensitivity value. If the transfer would not cause the sensitivity of the mobile device to be higher than the threshold in the given situation, then in step 14, the data item is transferred to the mobile device. However, if the transfer would cause the sensitivity of the mobile device to be higher than the threshold in the given situation, then in step 16, measures are employed to ensure that the aggregate sensitivity remains below the current threshold value. These measures are described in detail below. In general, however, these measures involve, e.g., redacting some or all of the data item (for example, in the case of total redaction, a non-sensitive placeholder such as an HTML document containing a link is sent to the mobile device) to reduce its sensitivity score and/or removing one or more of the data items already present on the mobile device to lower the overall aggregate sensitivity, thus allowing the new data item to be transferred.

The threshold value for the amount of sensitive information allowed on the device will be impacted by a variety of factors that are related to the assumed risk for data loss related to the mobile device. The security features of the mobile device are one important element for the threshold value since users will be willing to store a larger amount of sensitive information on a device that uses strong encryption mechanisms to store the data since this offers some level of protection against unauthorized access. Strong access control mechanisms will also typically increase the amount of sensitive information a user will allow on his device by choosing a higher threshold (e.g., a mobile device offering fingerprint authentication may be deemed more safe than a device only offering a 4 digit PIN code). Known problems with the security mechanisms will also have an impact on the chosen threshold. While these factors for the threshold value are fixed, other factors relevant for choosing the threshold value for sensitive information on the mobile device are changing over time. The potentially changing factors for the threshold value are considered the "context" of the mobile device, the reaction to changes in the context are a core element of the present technique and described below.

Upon receipt of the redacted data, for example, the user can explicitly request the system to send the sensitive data item (e.g., by clicking the placeholder document link) when the content of the data is needed. Then, in this example, the user's request is fulfilled while meeting the allowed sensitivity level of the mobile device as follows.

First, in step 18, a minimal set of sensitive data items currently on the device are selected and removed so that the sum of the sensitivity scores of the requested data item is less than or equal to the sensitivity of the selected data items. This ensures that the new set of data items in the mobile device will be acceptable with respect to the policy given the new user context. The selection can take additional features like last access into account to make an optimal choice from a usability perspective.

In step 20, a list of removed data items is recorded, and the sensitivity of the remaining set of documents on the mobile device is determined. The requested data item can then be transferred to the device, as per step 14.

In step 22, when the threshold for the allowed amount of sensitive documents increases (e.g., if the user moves to a more secure location), it is preferred that some (or all) of the data items removed at step 18 are automatically restored to the mobile device if the need for these data items is anticipated. Alternatively, a different set of data items may instead be transferred to the mobile device if it seems to better fit the needs of the mobile device user as long as the total sensitivity does not exceed the threshold.

The above processes are applied to situations where the user context changes (e.g., the user leaves the office and enters a less secure location). If desired, the sensitivity of data on a given mobile device may be reduced by redacting or otherwise removing some portion of the data. By way of example only, in a mortgage application, Social Security numbers, names and addresses might be redacted to reduce the sensitivity of the document.

Figure 2:
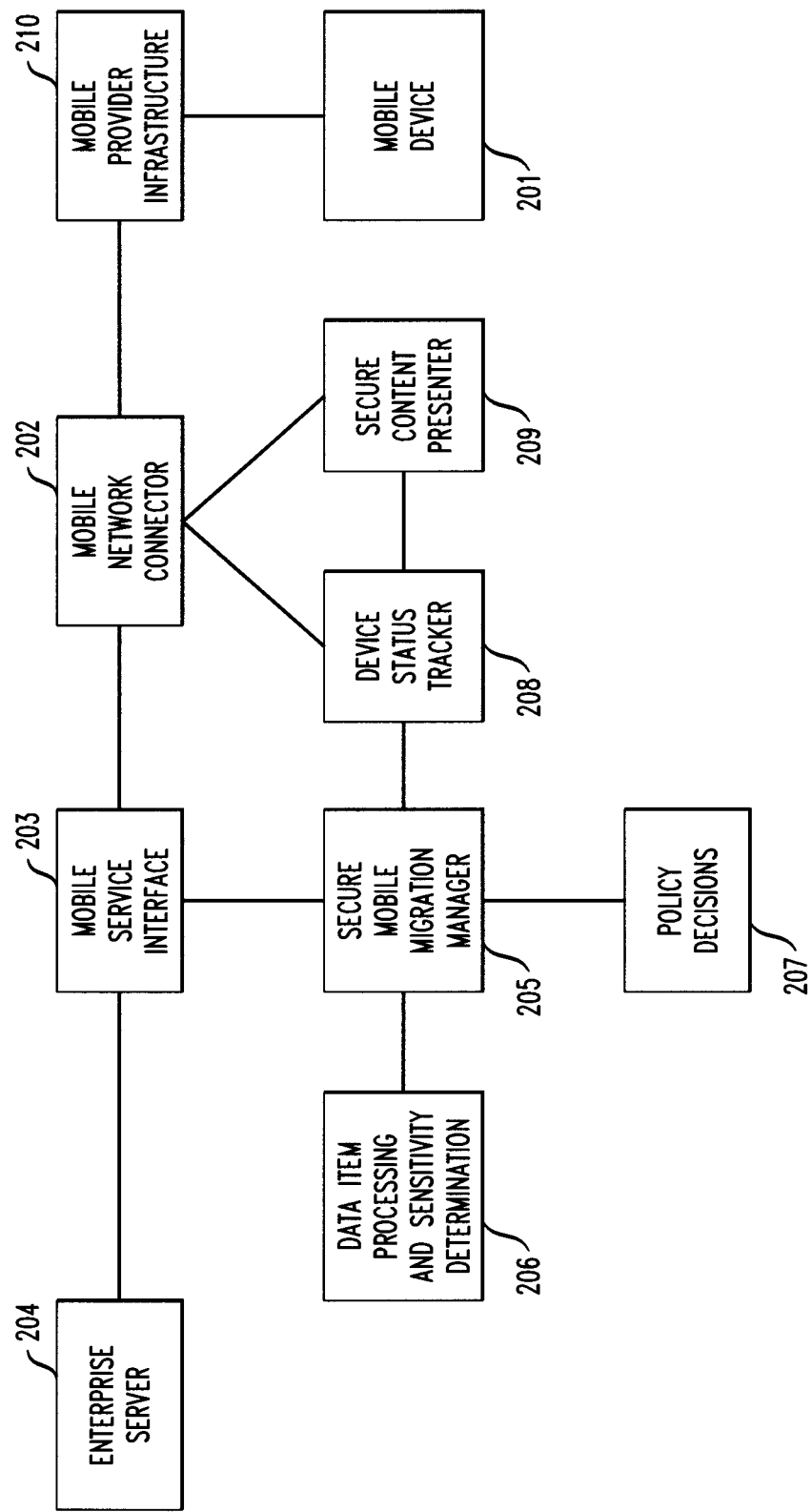
FIG. 2 is a diagram illustrating the high level components involved in the implementation of the present techniques according to an embodiment of the present invention.
Figure 10:
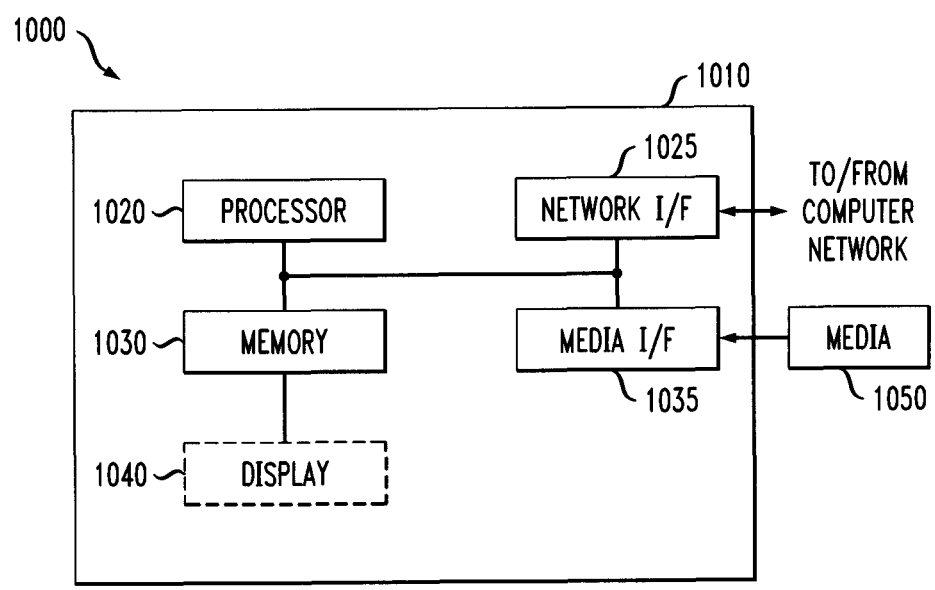
FIG. 10 is a diagram illustrating an exemplary apparatus for performing one or more of the methodologies presented herein according to an embodiment of the present invention.

FIG. 2 shows a high level view of the components involved in the implementation of the present techniques. The Mobile Device 201 connects to Mobile Network Connector 202 to access resources in the enterprise on Enterprise Server 204 (e.g., a mail server or calendar server). An exemplary apparatus that can serve as Enterprise Server 204 is shown in FIG. 10, described below. This connection may involve authentication, encryption and other technologies known in the art to secure the communication and prohibit access from unauthorized devices. The Mobile Network Connector 202 forwards the communication to the Enterprise Server 204. Data is sent to the Mobile Device 201 from the Enterprise Server 204 while passing through the Mobile Service Interface 203 which may modify the data items sent to the Mobile Device 201. The Mobile Network Connector 202 may further modify the data sent, e.g., by encrypting the data items while in transit.

The connection between the Mobile Device 201 and the Mobile Network Connector 202 is established using the Mobile Provider Infrastructure 210. This connection may involve multiple components like mobile network antennas, WiFi antennas and backbone networks operated by the service provider or the Mobile Device 201.

The Mobile Service Interface 203 may modify the data items to translate from one data format to another, e.g., to allow the use of specific protocols for mobile devices to access data resources using standard protocols. In addition to these lower level transformations, the Mobile Service Interface 203 may modify the data items sent to the Mobile Device 201 by using the Secure Mobile Migration Manager 205 to manage the amount of sensitive information stored on the Mobile Device 201 at any point in time. In one exemplary embodiment, this modification is executed by a plug-in for an existing mobile platform infrastructure. In another exemplary embodiment, this modification is executed in an additional component forwarding the data item, e.g., a proxy for the data item access protocol used to communicate with the Enterprise Server 204.

The Secure Mobile Migration Manager 205 may modify the data items sent to the Mobile Device 201 to reduce the data item sensitivity (also called redacting the data item), either by replacing individual elements in the data item (e.g., account numbers in an email), by replacing whole subparts (e.g., removing an attachment) or by replacing the whole data item with a non-sensitive placeholder (e.g., an HTML fragment with a link used to request the email content or view the content in a web browser instead of being replicated to the Mobile Device). The Secure Mobile Migration Manager 205 uses several components to perform this task: Data Item Processing and Sensitivity Determination component 206 processes the data and determines its sensitivity. In a preferred embodiment, the Data Item Processing and Sensitivity Determination component 206 is configured to reduce the data item sensitivity by redacting the content, if applicable, based on the data item structure, e.g., by removing a sensitive paragraph from a word document or by replacing account numbers in a PDF document.

Device Status Tracker 208 tracks information about the Mobile Device 201 which may include current location, current amount of sensitive information on the device, current time at the Mobile Device location, user history, and potentially more elements that are relevant to decide if a sensitive data item should currently be allowed to be transferred onto the Mobile Device 201. The Device Status Tracker 208 will receive updates from both the Secure Mobile Migration Manager 205 (e.g., which sensitive information was transferred to the device) and from the Mobile Device 201 (e.g., current location, nearby devices and other information based on sensory or user input on the device).

Policy Decisions component 207 uses the sensitivity decision made by Data Item Processing and Sensitivity Determination 206 and the status information obtained from the Device Status Tracker 208 to determine if a data item can currently be transferred to the Mobile Device 201. The Secure Mobile Migration Manager 205 will then redact the data item using the Data Item Processing and Sensitivity Determination 206 if the Policy Decisions component 207 decides that currently the data item may not be transferred to the Mobile Device 201 in an unmodified form.

The Secure Content Presenter 209 is a component used to present data items in a secure way without storing them on the Mobile Device 201. This presentation component may also implement additional authentication and identification methods currently known in the art (e.g., passwords, security questions, fingerprint scans or other advanced methods if supported by the device) and request the user to identify himself based on the current context for the Mobile Device 201. In a preferred embodiment, the Secure Content Presenter 209 generates logs and alerts about what data items were presented on the Mobile Device 201 by the Secure Content Presenter 209. These logs and alerts can be used to inform other systems or humans about current or excessive usage of the presentation component.

In one exemplary embodiment, the Secure Mobile Migration Manager 205 modifies the data items to instruct the Mobile Device 201 to periodically refresh the data items if the protocol used between the Mobile Device 201 and the Mobile Service Interface 203 does not offer support for the Mobile Service Interface 203 to initiate refreshing a data item. In one exemplary embodiment, the data items transferred are HTML pages and the modification added by the Secure Mobile Migration Manager 205 is an HTML tag that causes the browser on the Mobile Device 201 to reload the HTML page after a preset timeout. This allows the Secure Mobile Migration Manager 205 to redact the data if necessary when it's refreshed by the Mobile Device 201 after the reset timeout.

Figure 2A:
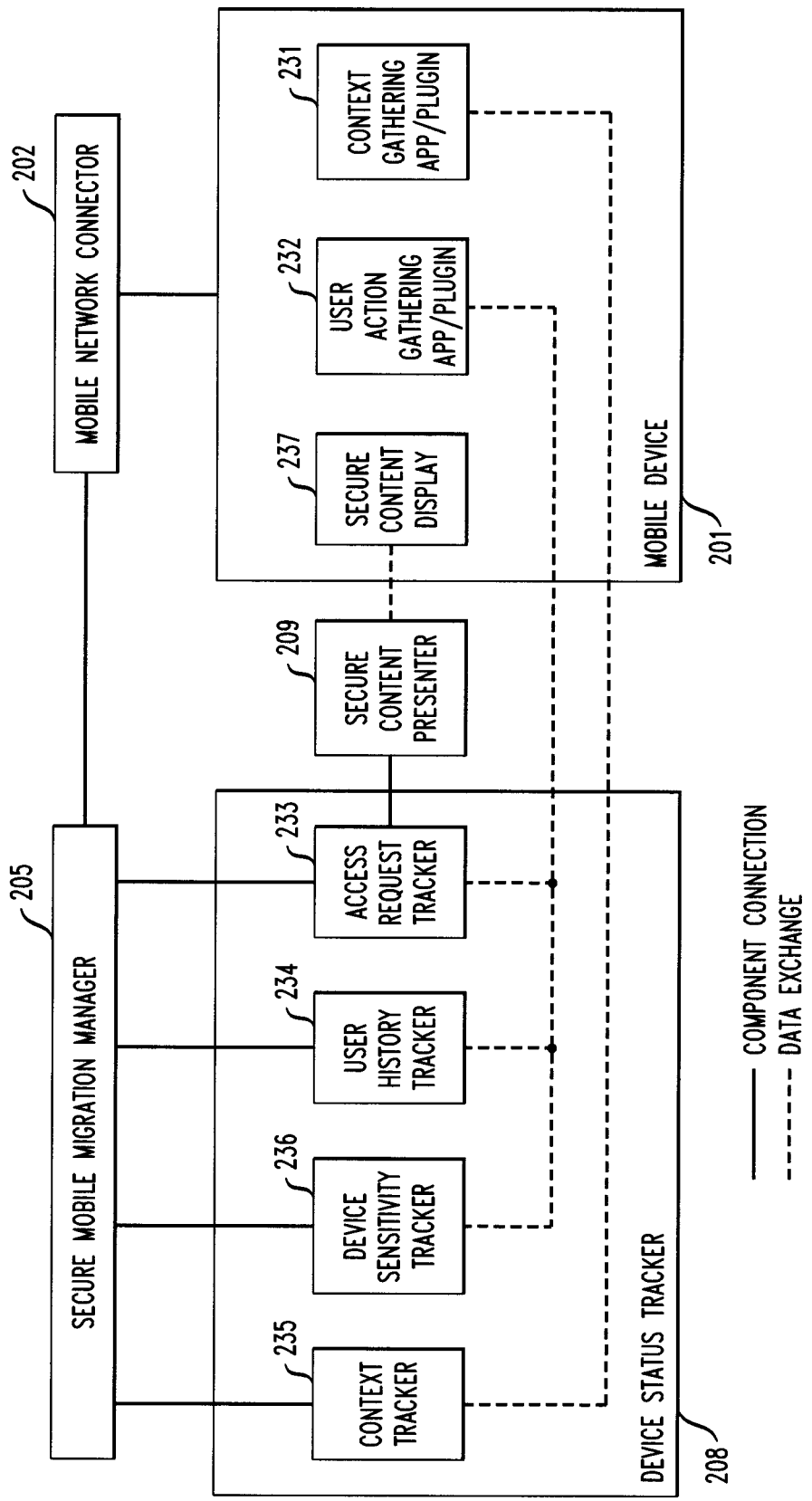
FIG. 2a is a diagram giving additional detail about the Device Status Tracker and about subcomponents of the Mobile Device introduced in FIG. 2 according to an embodiment of the present invention.

FIG. 2a is a diagram illustrating the Mobile Device 201 components and the subcomponents of the Device Status Tracker 208. The dashed lines in FIG. 2a indicate the exchange of data between components, the actual transfer of the data is realized through the component connections indicated as solid lines. The dashed lines are only used to emphasize collaboration between components on the Mobile Device 201 and the Device Status Tracker 208.

The Mobile Device 201 has three components or plug-ins that support the Device Status Tracker 208. The first component is the "Context Gathering App/Plugin" 231 that acquires information about the current context of the Mobile Device 201. The information gathered includes sensory information such as geographic location, acceleration, local time, ambient light level, mobile devices (e.g., WiFi or Bluetooth) within communication range; connection information such as currently connected devices (devices connected wirelessly, e.g. through WiFi or Bluetooth; or currently connected wired devices, e.g., through a USB port) or network connection status; and information about recent events related the device that can be queried from the device interfaces or gathered from log entries available on the Mobile Device 101. As will be described in detail below, recently connected devices can be determined by a Context Tracker which will use the current and previous contexts reported by this app as the Context Tracker stores the history. Examples for events are: log entries about network connections established or severed, program crashes or other relevant information known to the art that is customary found in system log files. Other examples for events are a list of failed login attempts if provided by the Mobile Device 201, a list of recent successful logins if provided by the Mobile Device 201, a list of applications currently running on the Mobile Device 201, and log entries for other information that is known to be relevant to decide whether sensitive information may be transferred to or should be removed from the device.

The event information transferred to the Context Tracker 235 can be used as input for the Device Specific Policies 256 (see FIG. 2b, described below) as additional evidence for risk estimation. Multiple failed login attempts after a prolonged period of time without device movements in a geographic location that is not considered safe (e.g., a public restaurant) can be used as an indicator for a lost device with an unauthorized user trying to gain access. If one or more of such indicators are detected, the Device Specific Policies 256 may report a reduced sensitivity threshold value for the device to ensure sensitive information is minimal on the Mobile Device 201 given the potential loss situation. The Device Specific Polices 256 can adjust the amount by which the threshold is lowered according to the number of such indicators found based on the event information or the sensory information.

Other information like the currently running applications may also be used to adjust the threshold based on a risk they may present in terms of a device loss. If a web browser is currently running, there may be a risk of the browser displaying sensitive information currently not replicated to the Mobile Device 201. The Context Tracker 235 provides this information for the Device Specific Policies 256 to enable lowering the threshold based on sensitive information visible on the Mobile Device 201 but not tracked by the Device Sensitivity Tracker 236 since it was not transferred by the Secure Data Migration Manager 205. In a preferred embodiment, the User Action Gathering App/Plugin 232 (described below) informs the Device Sensitivity Tracker 236 about sensitive information that was downloaded by the Mobile Device 201 by an application. If the application is no longer running it can indicate that the sensitive information is no longer available on the Mobile Device 201, e.g., if the web browser that downloaded the sensitive information is closed.

Depending on the device capabilities, the Context Gathering App/Plugin 231 also generates alerts that indicate risk situations like a sudden acceleration downwards followed by an abrupt stop that might indicate a dropped device, indicating some probability for an occurring device loss. Unexpected loss of communication with other devices (e.g., another mobile device owned by the same owner is moving away) might also serve as a loss alert that can be used to adjust the current device loss risk estimate and based on that adjust the maximum amount of sensitive information on the Mobile Device 201.

The User Action Gathering App/Plugin 232 tracks user actions on the device to get the current working context of the user. The component reports relevant user actions like reading a specific email to the User History Tracker 234 to support prediction of data items needed in the near future, e.g., based on information that links several data items together like thread information for email replies. In one exemplary embodiment, this information is collected using existing services provided by the Mobile Device 201. In another exemplary embodiment, the User Action Gathering App/Plugin 232 modifies the installed software on the Mobile Device 201 to gain the necessary information. In yet another exemplary embodiment, the User Action Gathering App/Plugin 232 monitors the input devices and network communication to determine the current user actions.

In a preferred embodiment, the Context Gathering App/Plugin 231 translates the information gathered into labels and sends these labels to the Context Tracker 235. These labels encode relevant information about the context (e.g., location "public restaurant" instead of a specific venue or geographic location, "nearby unknown Bluetooth-enabled cell phone" instead of the specific Bluetooth ID) but increase the privacy for the user of the Mobile Device 201. In another exemplary embodiment, the raw context information is sent to the Context Tracker 235. In yet another exemplary embodiment, the Context Gathering App/Plugin 231 by default sends aforementioned labels to the Context Tracker 235 but enables the Context Tracker 235 to request the raw information if needed for a more accurate loss risk estimation.

The Device Sensitivity Tracker 236 maintains an inventory of the data items currently stored on the Mobile Device 201 by tracking which data items are transferred and which data items are removed from the device based on actions taken by the Secure Mobile Migration Manager 205 or based on actions taken by the user. The Device Sensitivity Tracker 236 also tracks what redaction actions were taken on the data items before they were transferred to the Mobile Device 201. In a preferred embodiment, the Device Sensitivity Tracker 236 will also be informed by the User Action Gathering App/Plugin 232 about actions that impact the amount of sensitive information on the Mobile Device 201 like a manual transfer of data items to the Mobile Device 201 that are not monitored by the Mobile Service Interface 203, local deletion of data items on the Mobile Device 201 and termination of applications running on the Mobile Device 201 that cause data items to no longer be accessible (e.g., closing a browser window that displayed a sensitive data item). This information allows the Device Sensitivity Tracker 236 to report a more accurate list of data items currently on the Mobile Device 201.

In a preferred embodiment, the Device Sensitivity Tracker 236 monitors the maintained list of data items currently on the Mobile Device 201 and generates alerts about changes of the sensitivity level and uses these to generate log files or alert other systems or humans responsible for data security within the enterprise about current or excessive data sensitivity levels on the Mobile Device 201.

The Context Tracker 235 gathers information about the current context of the Mobile Device 201, e.g., the geographic location, the current time (in the timezone for the location), nearby devices (e.g., by using Bluetooth and wireless interfaces) and other sensor information available (e.g., light sensor, motion sensor). These context clues will be used to select the right policy to be used by the Policy Decision Point 254 (see FIG. 2*b*, described below). The Context Tracker 235 may be supported by Context Gathering App/Plugin 231 on the Mobile Device 201 that reports the sensory information to the Context Tracker 235. It may also use services provided by the Mobile Device 201 manufacturer or information available from the Mobile Provider Infrastructure 210 to gather information related to the current context of the Mobile Device 201. The Context Tracker 235 will provide both current components of the context (e.g., the last known geographic location or currently connected devices) as well as recently active values of the components (e.g., the geographic locations known for the last day, the devices connected within the last hour, or the number of failed login attempts since the geographic location of the Mobile Device 201 changed by more than 100 feet).

In one exemplary embodiment, the Context Tracker 235 will inquiry additional information from the Mobile Provider Infrastructure 210 related to the Mobile Device 201. This information may include data about the cell phone tower used and geographic location estimates for the Mobile Device 201 based on cell tower triangulation. The Context Tracker 235 will use that information to verify the information transmitted by the Context Gathering App/Plugin 231 to detect manipulated data (e.g., if an attacker causes the Context Gathering App/Plugin 231 to send the wrong information) or to supplement missing data (e.g., if the geographic location is currently not available on the Mobile Device 201 due to reception issues).

In a preferred embodiment, the Context Tracker 235 generates logs and alerts about the current context of the Mobile Device 201. These logs and alerts can be used to inform other systems or humans about current or unusual contexts for the Mobile Device 201 (e.g., presence of unexpected devices in close proximity, location of the device in an unusual location etc.).

The User History Tracker 234 keeps a history of the user information over time and creates predictive models about the future user behavior used to anticipate the need for data items on the Mobile Device 201. Predictive models are known to those of skill in the art and thus are not described further herein. User History Tracker 234 will collect the history information from the Secure Mobile Migration Manager 205 (e.g., based on documents explicitly requested by the user), from the User Action Gathering App/Plugin 232 or by using additional services provided by the Mobile Device 201 manufacturer or the Mobile Provider Infrastructure 210 for the Mobile Device 201. The information used by the user history tracker to predict the need for a specific data item on the Mobile Device 201 includes: the last time the user accessed a data item, the number of times a user accessed the data items in the past, the context a user routinely access the data item or similar data items (e.g., the user usually reads a status report first thing in the morning, personnel reports are usually read by the user in the train on the way home), and other information known to the art to be customarily used to do user modeling with respect to the use of, or need for, data items. The User History Tracker 234 will also use information about related data items (e.g., a previous data item for which a data item in question is a response) to predict the need for a data item in question.

The User History Tracker 234 uses the prediction to determine if there is an immediate need for the data item on the Mobile Device 201. The need is immediate if the prediction indicates that the user is likely to access the data item within a predetermined period of time. In a preferred embodiment, the Secure Mobile Migration Manager 205 adjusts the sensitive information on the Mobile Device 201 in regular intervals no longer than the predetermined time used by the User History Tracker 234 to determine immediate need in order to proactively transfer the data items immediately needed to the Mobile Device 201 by the time the user is likely to want to access them.

There are techniques well known in the art to model the anticipated interest of a user in a document, modeling the need for a document is a variation on this since the need can be interpreted as an interest in the document. One example for a system modeling interest based on observed behavior is provided in H. Lieberman, "Letizia: An agent that assists web browsing," In Mellish, C. S., ed., *Proceedings of the Fourteenth International Joint Conference on Artificial Intelligence*, San Mateo, Calif.: Morgan Kaufmann, 924-929 (1995) (hereinafter "Lieberman"), the contents of which are incorporated by reference herein, another example of inferring user interest from observed behavior is given in M. Claypool et al., "Inferring User Interest," *Internet Computing, IEEE*, vol. 5, no. 6, pp. 32-39 (November/December 2001) (hereinafter "Claypool"), the contents of which are incorporated by reference herein.

The similarity in this context can be defined in various ways know to the art. In an exemplary embodiment, the similarity of two data items is determined by measuring the distance between the two data items in a feature vector space. The features are created by using structured information from the data item (e.g., sender and recipient in emails), data labels reported by the Data Sensitivity Estimator 252 (described below), and the additional information reported by the Enterprise Context Interface 253. As known in the art, the distance function can weight the features for the distance measurement according to predetermined weights. It is also well known in the art that the weights can be automatically determined by a process that learns optimal weights from a set of data items where the similarity of the data items to each other is known.

The Access Request Tracker 233 monitors which data items were accessed by the user of the Mobile Device 201. The Access Request Tracker 233 will also receive explicit requests for a document, e.g., if the user activates a placeholder that replaced a sensitive data subitem before the data item was sent to the device. In this case the Access Request Tracker 233 will report this explicit data request to the Secure Mobile Migration Manager 205. Alternatively, the Access Request Tracker 233 may offer to display data items on the Mobile Device 201 using the Secure Content Presenter 209. The Access Request Tracker 233 also keeps logs of explicit data requests and determines unusual user behavior. As known in the art unusual behavior can be determined in various ways, e.g., by checking for unusually high frequency of access requests or by receiving access requests at an unusual time.

The Access Request Tracker 233 also provides the capability to list all the redacted data items on the Mobile Device 201 in a format that can be displayed on the Mobile Device 201. This list also contains elements that can be activated (e.g., HTML links) to indicate the need for an unredacted version of that data item. The Access Request Tracker 233 queries the Device Sensitivity Tracker 236 to create the list of redacted data items on the Mobile Device 201.

In an exemplary embodiment, the Access Request Tracker 233 generates logs and alerts about what data items were requested by the user of the Mobile Device 201. These logs and alerts can be used to inform other systems or humans about current or excessive requests for unredacted version of currently redacted data items originating from the Mobile Device 201. For example, if there are a lot of requests that indicate too much sensitive data is requested (deleting other data to keep the sensitivity score under the threshold) these logs and alerts can be used as an indication that the device is lost and an unauthorized user is trying to obtain information from the Enterprise Server. An external system could try to immediately lock out the device user as a precaution. Or the manager can be informed who can call or manually lock the account based on the alert. Another reason for generating logs and alerts relates to auditing. Say for example the device is stolen. With a log, it can be determined which information was on the device when the device was stolen and what (if any) was downloaded after the loss.

The Secure Content Display 237 implements a secure way to display data items on the Mobile Device 201 ensuring the loss of the device does not expose any information contained in the data item. This involves ensuring no traces of the data item are left on the Mobile Device 201 after the data item is no longer displayed. The Secure Content Display 237 also removes the data item from the display of the Mobile Device 201 as soon as the user is no longer using the device (e.g., it removes the data item from memory as soon as the screen saver of the device activates or as soon as a predefined amount of time has passed without any measurable user activity). The Secure Content Display 237 may also implement additional authentication methods by either requesting input from the user of the Mobile Device 201 or by using additional authentication mechanisms offered by the Mobile Device 201, e.g., biometrical authentication mechanisms like fingerprint scans. These authentication mechanisms may be triggered by the Secure Content Presenter 209 before transferring sensitive data items to the Secure Content Display 237 or by the Access Request Tracker 233 after the Secure Mobile Migration Manager 205 has determined that additional authentication is required to send new sensitive data items to the Mobile Device 201. Thus additional authentication may (or may not) be required even though the sensitivity score does not exceed the threshold. For instance, the system ensures that the threshold will not be exceeded. But unauthorized requests to all data items sequentially also should be avoided (i.e., this would not exceed the threshold at any point in time, but still over time reveal all data items). This basically can add a "sensitivity score for all items that were on the device over a predefined time period" in addition to the sensitivity score for any given point in time. In a preferred embodiment, the Secure Content Display 237 also monitors the data on the Mobile Device 201 for traces of sensitive information left by other display processes (e.g., a browser cache on the Mobile Device 201) and removes these from the Mobile Device 201.

Figure 2B:
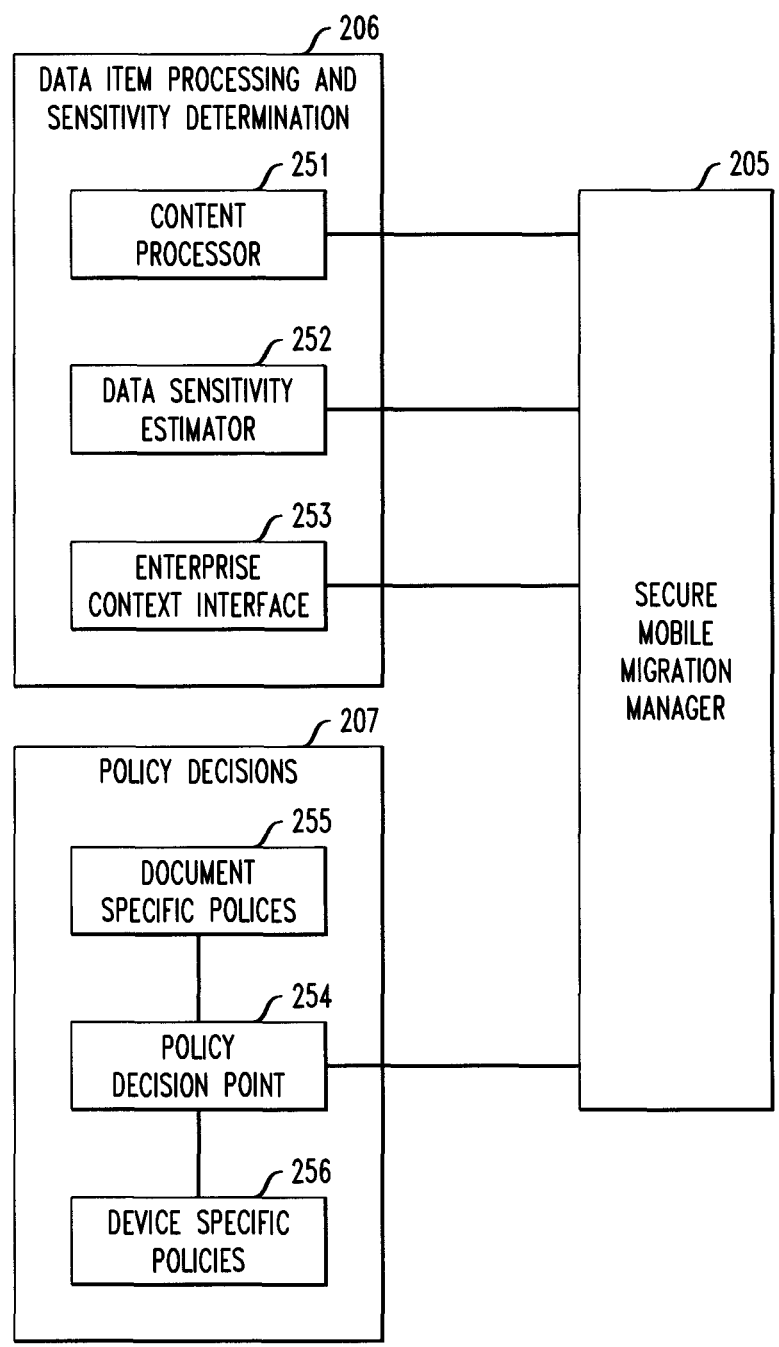
FIG. 2b is a diagram giving additional detail about the Data Item Processing and Sensitivity Determination and the Policy Decisions introduced in FIG. 2 according to an embodiment of the present invention.

FIG. 2b describes the Data Item Processing and Sensitivity Determination component 206 and the Policy Decisions component 207 in more detail. A Content Processor 251 analyzes the data item and the Content Processor 251 may separate the data item into multiple distinct data subitems (e.g., email body multiple email attachments). The Content Processor 251 may also be used to replace data subitems with placeholders that link instead to a data subitem or to redact a data subitem by replacing specified content with a substitute content that may lower the overall sensitivity of the data subitem.

A Data Sensitivity Estimator 252 assigns a sensitivity score to each data subitem by analyzing the content of the data subitem. One exemplary embodiment implements a process as described in U.S. application Ser. No. 12/910,587 filed by Park et al., entitled "Estimating the Sensitivity of Enterprise Data,", the contents of which are incorporated by reference herein, to determine the sensitivity. Another exemplary embodiment for the Data Sensitivity Estimator 252 can use additional information like sender or recipient of an email or the author of a document to estimate sensitivity of the content by comparing the meta information to previously known meta information and related sensitivity scores. A third exemplary embodiment uses various classifications techniques to determine a set of labels for the content of the data item and maps the labels to predetermined sensitivity scores for these labels. Yet another embodiment uses multiple possible embodiments and combines their results resulting in an implementation for the Data Sensitivity Estimator 252 that combines the strength of multiple techniques known to the art.

An Enterprise Context Interface 253 retrieves additional information available in the enterprise related to the data item or to one or more data subitems used to decide if the data subitems may be transferred to the mobile device. The additional information can be anything that can be used by the Document Specific Policies 255 or the Device Specific Policies 256. In one exemplary embodiment, this includes organizational roles of authors, sender and recipients of data subitems, the creation and modification times of the data item, data labels about content and sensitivity stored in another information service (e.g., a Web Service or Content Repository) related to the data item, similarity of the data item to a set of known highly sensitive data items, publishing or release dates for the data item stored in another information service (e.g., a Web Service or Content Repository), a list of people or groups allowed access to the data item, labels related to the Mobile Device 201, the owner of the Mobile Device 201, the user of the Mobile Device 201, the device capabilities for the Mobile Device 201 (especially the security capabilities), and information about the currently enabled policies and profiles for the Mobile Device 201. The information retrieved will be transferred to and then processed by a Policy Decision Point 254.

The Policy Decision Point 254 decides if a data item may be transferred to the Mobile Device 201 based on the sensitivity estimates provided by the Data Sensitivity Estimator 252, the information provided by the Enterprise Context Interface 253 and the amount of sensitive information currently stored on the device that is tracked by the Device Sensitivity Tracker 236 (see FIG. 2a). The decision is made based on either the original data item or based on a data item that is modified (e.g., by replacing a data subitem with a placeholder indicating its removal).

FIG. 3 shows the handling of a data request originating at the Mobile Device 201. In step 301 this request from the Mobile Device 201 could be initiated by a user action, an automated timer or by a signal from a push channel from the Mobile Service Interface 203 to the Mobile Device 201. The process determines if the data item needs to be partially or totally redacted and sends either the original or a redacted version of the data item to the Mobile Device 201.

The Mobile Service Interface 203 requests a data item from the Enterprise Server 204 (e.g., the mail server) in step 302. The data item returned from the Enterprise Server 204 is forwarded to the Secure Mobile Migration Manager 205 in step 303. The Secure Mobile Migration Manager 205 determines the data item sensitivity score (using the Data Item Processing and Sensitivity Determination component 206) in step 304. In one exemplary embodiment, the data item is split into individual subitems (e.g., attachments and email body). After the data items (or subitems) are analyzed, the Secure Mobile Migration Manager 205 determines if the data item is sensitive according to various policies by using the Policy Decisions component 207 in step 305. Details of step 304 are presented in FIG. 4, described below.

If it is determined in step 305 that the data item is sensitive, then the Secure Mobile Migration Manager 205 will use the Access Request Tracker 233 to determine if the data item is currently tagged as "low priority" (step 315). If the sensitive data item is tagged as "low priority" the processing will continue at step 314 where the sensitive data item will be redacted and this redacted version will subsequently be sent to the Mobile Device 201 instead of the requested sensitive data item. The description of step 314 below provides more detail for the redaction.

If in step 315 the Access Request Tracker 233 determines that the data item is not marked as "low priority" then the Secure Mobile Migration Manager 205 will determine the current sensitivity score for all data items currently on the Mobile Device 201 and current maximum sensitivity score for the Mobile Device 201 in step 309. The Secure Mobile Migration Manager 205 will also determine the total sensitivity of all data sent to the Mobile Device 201 since the last successful authorization, even though not all of this sensitive data may currently be stored on the Mobile Device 201. Details for step 309 are given in FIG. 5, described below. In step 317, the Secure Mobile Migration Manager 205 adds the sensitivity score for the current data items as determined in step 304 to the current sensitivity score for the Mobile Device 201. The current sensitivity score as determined in step 317 and the recent sensitivity score as determined in step 309 are checked against the policies to determine if a sensitivity threshold for the device is exceeded (step 310). If the threshold for the device sensitivity is exceeded in step 310, the Secure Mobile Migration Manager 205 checks for the need for additional authentication by querying the Policy Decisions Component 207 in step 318. If additional authentication is required the Secure Mobile Migration Manager 205 will inform the Secure Content Display 237 to require additional authentication. Next the Secure Mobile Migration Manager 205 triggers a separate and potentially concurrently executed data management process in step 311. The details of this data management process are given in FIG. 6, described below. In the next step 312, the Secure Mobile Migration Manager 205 determines if the data item can be redacted. Redaction of the data item can be carried out in one of a number of ways. By way of example only, individual elements (e.g., words, account numbers and other small structural elements) in the data item can be replaced with an element indicating the replacement (e.g. XXXXXXXX123 for an account number) or with a syntactically and semantically equivalent but non-sensitive element (e.g., a special "sample" social security number instead of the real number). Depending on the aforementioned embodiments this is done on the data item or on one or more data subitems. The words or account numbers to be replaced can be identified as 'sensitive' based on word lists or rules as known in the art, e.g., in the field of pattern recognition. Structural elements (e.g., paragraphs, tables or similar elements) can also be replaced by a placeholder indicating the structural element was removed. For example, this placeholder can be an element that the user can click on to indicate his need for an unredacted version of the data item. In another example, the replacement is a text indicating the structural element was replaced. Depending on the aforementioned embodiments this is done on the data item or on one or more data subitems. The structural elements to be replaced can be identified as sensitive based on rules or other classification methods known in the art. An example for a system implementing document redaction can be found in E. Bier et al., "The Rules of Redaction: Identify, Protect, Review (and Repeat)," *Security & Privacy, IEEE*, vol. 7, no. 6, pp. 46-53 (November-December 2009), the contents of which are incorporated by reference herein.

One or more data subitems can also be replaced by a placeholder indicating the data subitem was removed. For example, this placeholder can be an element that the user can click on to indicate his need for an unredacted version of the data subitem. In another example, the replacement placeholder is text indicating the subitem was replaced. The decision on which data subitems are replaced is based on the sensitivity score determined for the data subitems in step 304.

If one of these redactions is possible, the Secure Mobile Migration Manager 205 redacts the data in step 313 and sends it back to step 304 where the next iteration starts with the redacted data to determine if the redacted data item may be transferred to the Mobile Device 201 without exceeding the maximum device sensitivity. This iteration enables the system to incrementally redact the content until the sensitivity is low enough to transfer it to the Mobile Device 201. The decision process applied in step 312 also keeps track of all the redactions already tried on the data item to make sure the iterative process terminates since there are only a limited number of redactions that can be tried. As known in the art this process can be optimized by having heuristics that suggest the most likely redaction to try first to reduce the sensitivity score for the data item.

If in step 312 the Secure Mobile Migration Manager determines that the data item is not redact-able in a way that effectively reduces the sensitivity (e.g., because the format of the data item is not editable, or because no removal of individual elements reduces the sensitivity enough) the whole data item excluding information necessary to keep the correct syntactical format for the data item is replaced with a placeholder in step 314 (e.g., the body and the subject of an email). According to an exemplary embodiment, this placeholder is an element that the user can click on to indicate his need for an unredacted version of the data item. In another embodiment, the replacement is text indicating the data item was replaced.

In step 306, the Secure Mobile Migration Manager 205 adds the data item to the bookkeeping records for the Mobile Device 201 stored in the Device Sensitivity Tracker 236, adjusting the current data sensitivity score for the Mobile Device 201. The data item, or if applicable its redacted version, is then sent back to the Mobile Service Interface 203 (step 307). The Mobile Service Interface 203 transfers the data item to the Mobile Device 201 (step 308). If the data item was not redacted in the overall process (i.e., did not go through step 313 or 314) the Secure Mobile Migration Manager 205 will remove a "high priority" label for this data item, if present, in the Access Request Tracker 233 in step 316 (see also FIG. 7, described below).

If in step 310 it is determined that the overall sensitivity threshold for the device would not be exceeded by adding the current data item (potentially redacted in a previous iteration), then the processing will continue in the previously described step 306 causing the aforementioned data item to be sent to the Mobile Device 201. The sensitivity score for the Mobile Device 201 is adjusted based on the aforementioned data item.

If in step 305 it is determined that the current data item (potentially redacted in a previous iteration) is not sensitive according to the policies then the Secure Mobile Migration Manager 205 will continue processing in the previously described step 306 and causing the aforementioned data item to be sent to the Mobile Device 201.

The process will also monitor the removal of data items from the Enterprise Server 204 as this will subsequently cause removal of the data item from the Mobile Device 201 and thereby potentially lowering the current sensitivity score for the Mobile Device 201. When the deletion of the data item is replicated to the Mobile Device 201 by the Mobile Service Interface 203 (i.e., effectively removing the data item from the Mobile Device 201) the step 306 is executed to adjust the current sensitivity score for the Mobile Device 201.

FIG. 4 shows the details for step 304. This process determines the sensitivity of a data item by splitting it into smaller subitems, if possible, based on the data item structure (e.g., emails into body and attachments), estimates the sensitivity of the data subitems through various means and finally aggregates the various estimates to create a total sensitivity estimate for the data item.

In step 401, the Secure Mobile Migration Manager 205 uses the Content Processor 251 to split the data item into data subitems if possible. If the data item cannot be split, the Content Processor 251 will return the complete data item as the only possible subitem. In step 402, the Secure Mobile Migration Manager 205 iterates over the returned subitems sending them to the subitem processing. If there is a subitem to process left in step 403 that subitem is sent to the Data Sensitivity Estimator 252 in step 404. The Data Sensitivity Estimator 252 returns labels for the subitem (e.g., content type like source code, paystub, . . . ), and in addition also determines a sensitivity score, e.g., by using a process as described in Park. In step 405, the Secure Mobile Migration Manager 205 queries the Enterprise Context Interface 253 for additional labels for the subitem. These labels can be used to encode any additional information available in the enterprise about a document (e.g., organizational role of the author or the mobile device user). The Secure Mobile Migration Manager 205 adds the labels returned to the total set of labels for the subitem. As known in the art in any of steps 404 or 405 the labels can be translated from one label set to another by the Secure Mobile Migration Manager 205. In step 406, the Secure Mobile Migration Manager 205 queries the Context Tracker 235 to obtain information related to the current context of the Mobile Device 201 (e.g., location or nearby devices, current geographic location, last time of authorization, excessive failed authorizations, . . . ). Context information, labels and sensitivity score are then aggregated into a single data structure in step 407. Additional transformations may be executed in this step to prepare the information collected in steps 404 to 406 into a format suitable for the Policy Decision Point 254. The aggregated information is sent to the Policy Decision Point 254 in step 408. The Policy Decision Point 254 consults the Document Specific Policies 255 to determine the sensitivity status of the data subitem and returns the determined status to the Secure Mobile Migration Manager 205 in step 409. The Policy Decision Point 254 will also return a sensitivity score based on the consulted Policy. The Secure Mobile Migration Manager 205 temporarily stores the status in step 410 and reiterates the process with the next data subitem in step 402. If in step 403 it is determined that all data subitems were processed, the Secure Mobile Migration Manager 205 will in step 411 aggregate the decisions for each subitem and make the determination about the data item sensitivity. The outcome of the decision is used in step 305 (of FIG. 3). The Policy Decision Point 254 can use the context information to return an "infinite" sensitivity score to effectively prohibit transfer of the document to the Mobile Device.

FIG. 5 shows the details for the Device Sensitivity Score Determination (step 309 of FIG. 3) executed by the Secure Mobile Migration Manager 205. This process determines the current sensitivity score for the Mobile Device 201 based on all the data items that are currently stored on the Mobile Device 201 and their redaction status.

Initially the Secure Mobile Migration Manager 205 determines current context for the Mobile Device 201 from the Context Tracker 235 in step 501. Next, the list of data items currently stored on the Mobile Device 201 is calculated in step 502 by querying the Device Sensitivity Tracker 236. The information for all data items are iteratively processed, starting in step 503. In step 504, the Secure Mobile Migration Manager 205 determines if there are any more data items to process. If more items are to be processed the next item is analyzed starting in step 505. In this step 505 the Policy Decision Point 254 re-calculates the current sensitivity score for the data item as currently present on the Mobile Device 201, similar to the processing that was done in step 304 (of FIG. 3) before this data item (or its redacted version) was transferred to the Mobile Device 201. Since the device context may have changed since the transfer to the Mobile Device 201 was executed this result may be different from previous decisions based on previous device contexts. In step 506, the determined sensitivity score for the data item is added to the current sensitivity score for the Mobile Device 201. In step 508, the Secure Mobile Migration Manager 205 determines if a different version of the data item was transferred to the Mobile Device 201 in the time between the last successful authentication and the time the data item (or its redacted version) was last transferred to the Mobile Device 201 by querying the Device Sensitivity Tracker 236 (step 508). If no other version was stored on the Mobile Device 201 in the mentioned time period the processing continues with the next data item in step 503.

If the Secure Mobile Migration Manager 205 determined in step 508 that there was a different version stored on the Mobile Device 201 in the mentioned time period it determines the sensitivity score for the data item (or its redacted version) sent to the Mobile Device 201 in the past, similar to the processing that was done in step 304 (of FIG. 3) before this data item (or its redacted version) was transferred to the Mobile Device 201 (step 509). Since the device context may have changed since the transfer to the Mobile Device 201 was executed this result may be different from previous decisions based on previous device contexts. In step 510, the determined sensitivity score for the data item is added to the recent sensitivity score for the Mobile Device 201.

If the Secure Mobile Migration Manager 205 determines in step 504 that there are no more data items to process it will in step 507 calculate the maximum sensitivity score for the Mobile Device 201 given the current context using the Policy Decision Point 254 using the Device Specific Policies 256. This is the threshold that the calculated total sensitivity score is compared against in step 310.

Figure 6:
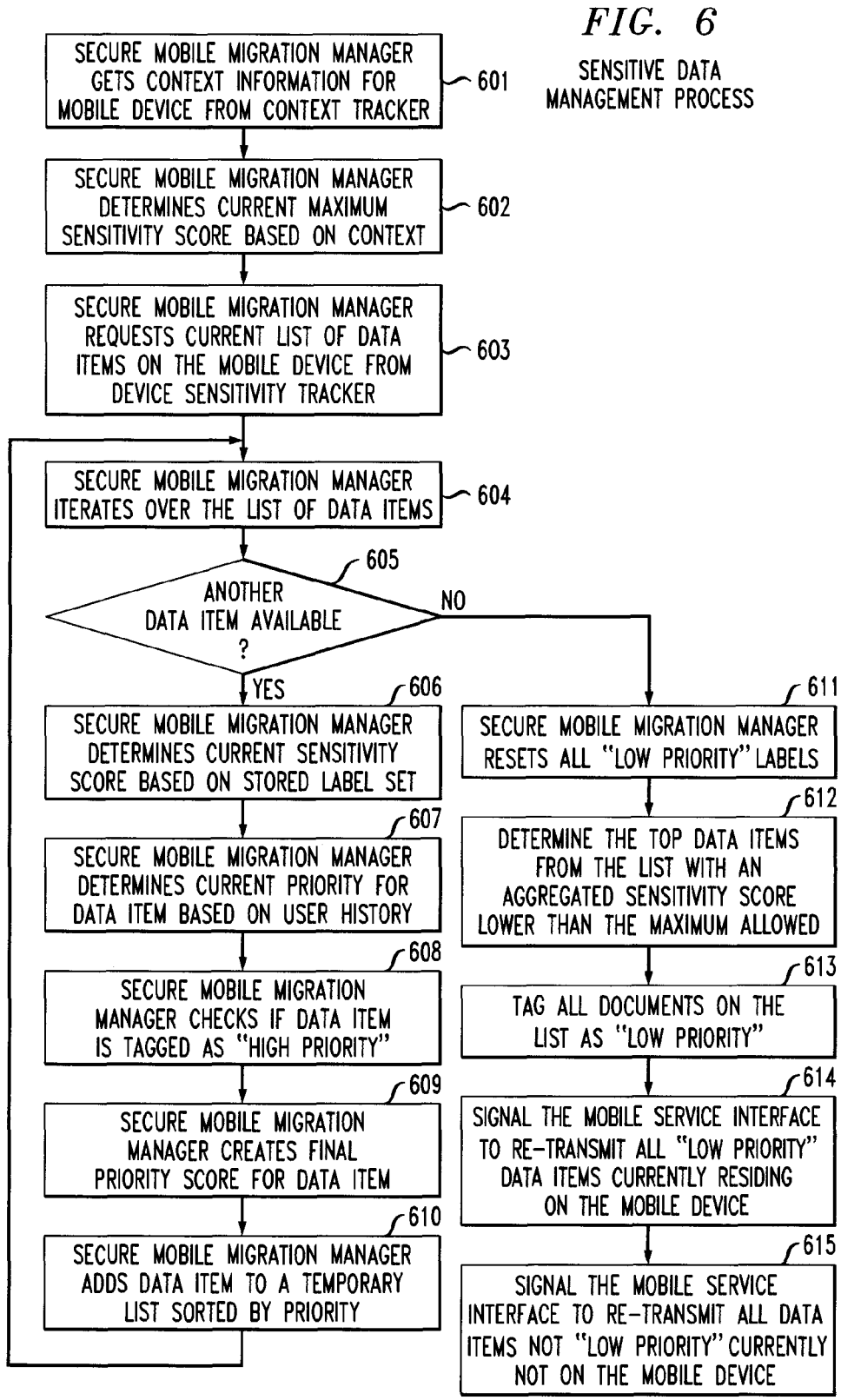
FIG. 6 is a diagram illustrating the sensitive data management process that ensures policy compliance for the Mobile Device by removing excessive sensitive information from the device while on the other hand ensuring that needed sensitive information is sent to the device without violating the policy according to an embodiment of the present invention.

FIG. 6 describes the sensitive data management process executed by the Secure Mobile Migration Manager 205. The sensitive data management process ensures the amount of sensitive information on the Mobile Device 201 does not exceed the current valid maximum sensitivity score while at the same time trying to ensure documents needed on the Mobile Device 201 are transferred, potentially replacing sensitive data items currently on the Mobile Device 201 that are deemed currently not needed by the user. This process can be triggered by various other processes, and it can also be run periodically by the Secure Mobile Migration Manager 205 to ensure compliance in case the maximum sensitivity score changes based on context changes, e.g. when the Mobile Device 201 moves to a new location that is less secure.

The Secure Mobile Migration Manager 205 starts the process in step 601 by getting the current context information for the Mobile Device 201 from the Context Tracker 235. This context information is used by the Secure Mobile Migration Manager 205 to determine the new maximum sensitivity score in step 602 by querying the Policy Decision Point 254 which in turn queries the Device Specific Policies 256 to determine the maximum sensitivity score for the current context. In step 603, the Secure Mobile Migration Manager 205 requests the list of sensitive data items from the Device Sensitivity Tracker 236 to re-examine if each data item should and can be stored on the Mobile Device 201 in its current redaction state (e.g., not redacted, partially redacted or completely redacted). This re-examination is started in step 604 by iteratively processing all data items. If the Secure Mobile Migration Manager 205 determines in step 605 that there are unprocessed data items, Secure Mobile Migration Manager 205 will in step 606 use the Policy Decision Point 254 to re-calculate the current sensitivity score for the currently processed data item similar to the processing in step 304. Since the device context may have changed compared to the last time the sensitivity determination was done for the current data item in the past this result may be different from previous decisions. In step 607, the Secure Mobile Migration Manager 205 uses the User History Tracker 234 to determine a priority for the currently processed data item. This priority determination uses heuristics like preferring newer data items over older data items, unread data items over read data items and data items related to recently viewed items (e.g., a response to a recently read email) over other data items. There are various other methods known in the art to determine an optimal set of data items given a set of constraints out of a larger set of data items that can be used for this priority decision. As mentioned earlier, user need is one important factor in the selection, examples for inferring user need from user actions are given in Lieberman and Claypool. Other methods for selecting the right document set can be adapted from the well-known field of cache algorithms.

In the next step (608) the Secure Mobile Migration Manager 205 verifies if the data item is tagged as "high priority" in the Access Request Tracker 233. This tag is set when the user explicitly requested an unredacted version of a data item when it is currently on the Mobile Device 201 in a (partially) redacted version. The sensitivity score, the priority based on user need heuristics and if present the "high priority" tag are aggregated into a final priority score (step 609), with the data items marked "high priority" ranking highest and very sensitive data items with a low priority score from the history ranking lowest.

In step 610, the data item and the final priority are added to a temporary list of data items which is kept sorted by descending final priority. The Secure Mobile Migration Manager 205 then continues with the next data item at step 604. If the Secure Mobile Migration Manager 205 determines in step 605 that all data items were processed the system will continue in step 611 by resetting all "low priority" labels for data items in the Access Request Tracker 233.

Next, in step 612, the top data items from the list created in step 610 are removed from the prioritized list. These top items are chosen in a way that the removed items have an aggregated sensitivity score less than the current maximum sensitivity score. The data items remaining on the list are then tagged as "low priority" in the Access Request Tracker 233 during step 613, after which the Mobile Service Interface 203 is instructed in step 614 to re-transmit all the data items that were newly marked as "low priority". The Mobile Service Interface 203 will use a method specific to the protocol between the Mobile Service Interface 203 and the Mobile Device 201 to initiate the re-transmit. When the data items are retransmitted the process described in FIG. 3 will effectively remove the "low priority" data items from the Mobile Device 201, replacing them with placeholders. After the "low priority" data items are retransmitted the Secure Mobile Migration Manager 205 instructs the Mobile Service Interface 203 to retransmit the data items currently not on the device but now not marked "low priority" (step 615). This will effectively transfer these data items onto the device since the total score of all sensitive data items currently on the Mobile Device 201 plus these data items to be retransmitted should be lower than the current maximum score.

In one exemplary embodiment, the Secure Mobile Migration Manager 205 alerts the user of the Mobile Device 201 using an email, a text message or another communication method offered on the Mobile Device 201 suitable to alert the user to manually initiate a refresh or to manually remove the data items now marked "low priority" from the Mobile Device 201. This allows management of sensitive data items on the Mobile Device 201 even if the communication protocol used between the Mobile Device 201 and the Mobile Service Interface 203 does not allow the Mobile Service Interface 203 to initiate the retransmission of redacted versions of the data items marked as "low priority" to replace more sensitive versions currently stored on the Mobile Device 201.

Figure 7:
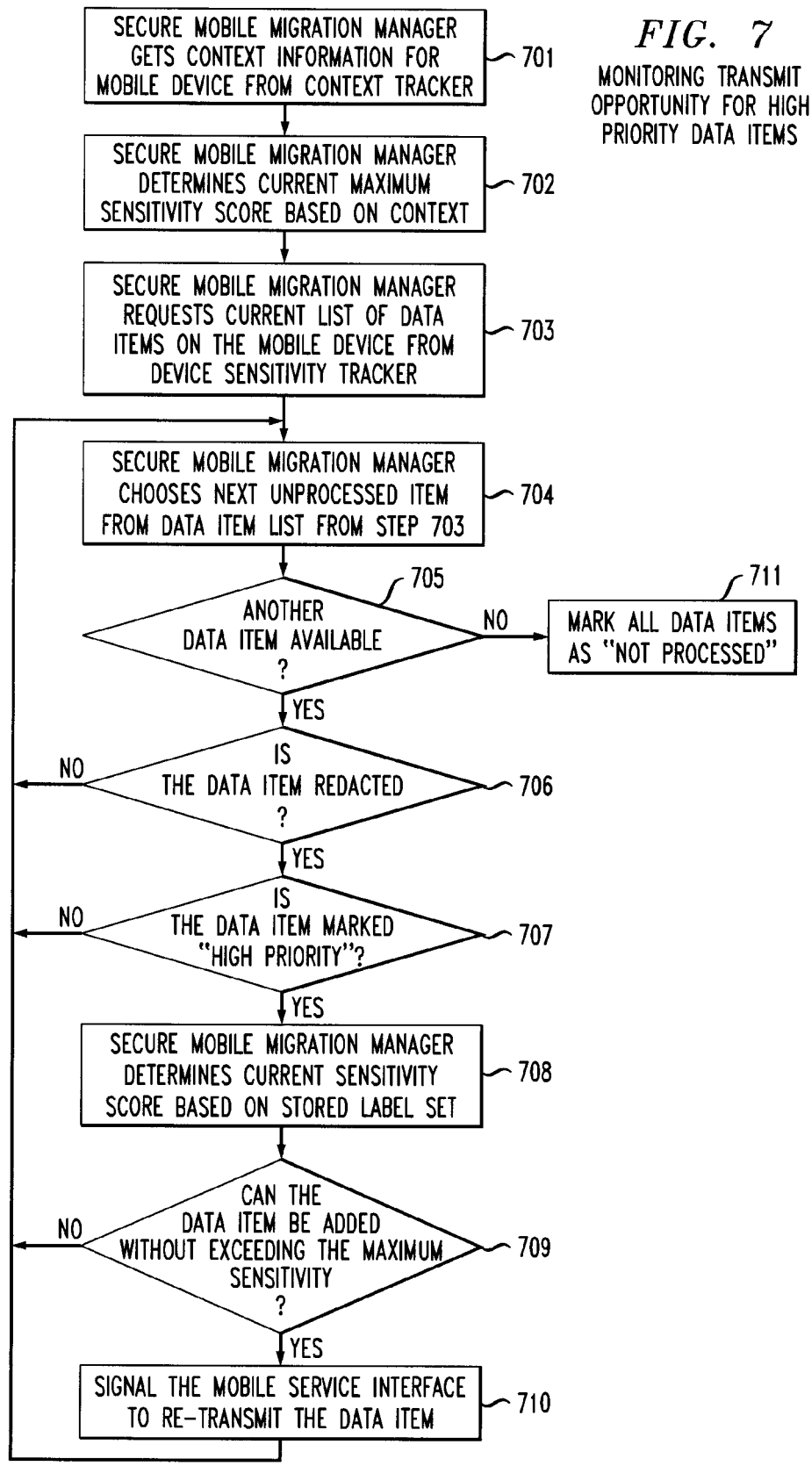
FIG. 7 is a diagram illustrating the process that tries to detect opportunities to transmit needed sensitive information to the Mobile Device based on either reduction of the current sensitivity score for the device (e.g., because documents were deleted from the device) or based on an increase of the currently allowed sensitive information on the device based on context changes according to an embodiment of the present invention.

FIG. 7 describes how the Secure Mobile Migration Manager 205 uses a positive delta between the currently valid maximum sensitivity score for the Mobile Device 201 and the current aggregated sensitivity score for all the data items currently stored on the Mobile Device 201 to re-transmit previously redacted or replaced data items to the Mobile Device 201. This ensures data items needed by the user of the Mobile Device 201 are transferred to the Mobile Device 201 as soon as the policies allow the transfer.

At various points in time, e.g. after the transmission of a data item, the removal of a data item from the Mobile Device 201, after a context update received by the Context Tracker 235, after the Device Sensitivity Tracker 236 is informed about a local deletion of a data item on the Mobile Device 201, or periodically at predetermined intervals, the Secure Mobile Migration Manager 205 will try to send data items marked as "high priority" in the Access Request Tracker 233 to the Mobile Device 201. Data items are marked as "high priority" based on user feedback.

The Secure Mobile Migration Manager 205 starts the process in step 701 by getting the current context information for the Mobile Device 201 from the Context Tracker 235. This context information is used by the Secure Mobile Migration Manager 205 to determine the new maximum sensitivity score in step 702 by querying the Policy Decision Point 254 which in turn queries the Device Specific Policy 256 to determine the maximum sensitivity score for the Mobile Device 201. In step 703, the Secure Mobile Migration Manager 205 requests the list of data items currently stored on the Mobile Device 201 from the Device Sensitivity Tracker 236 to determine if any data items marked "high-priority" can currently be transmitted to the Mobile Device 201 without exceeding the maximum sensitivity score for the Mobile Device 201.

In step 704, the Secure Mobile Migration Manager 205 starts iteratively processing all data items by choosing the next unprocessed data item from the list generated in step 703 and marks that data item as processed. If the Secure Mobile Migration Manager 205 determines in step 705 that there are unprocessed data items, Secure Mobile Migration Manager 205 first checks if the data item is currently redacted (step 706) by querying the redaction status from the Device Sensitivity Tracker 236. If the data item is currently stored unredacted on the Mobile Device 201 the next data item is processed in step 704.

If the data item was redacted, the Access Request Tracker 233 determines in step 707 if the data item is marked as "high priority" in the Access Request Tracker 233. If the data item is not currently marked as "high priority" the next data item is processed in step 704.

In the case the document is marked "high priority" the Secure Mobile Migration Manager 205 will in step 708 use the Policy Decision Point 254 to re-calculate the current sensitivity score for the document similar to the processing in step 304. The Secure Mobile Migration Manager 205 determines in step 709 if adding the data item to the Mobile Device 201 would exceed the currently valid maximum sensitivity score for the Mobile Device 201, similar to the processing in step 317. If transferring the data item to the Mobile Device 201 in an unredacted form would exceed the maximum sensitivity score the next data item is processed in step 704. If the data item can be transferred to the Mobile Device 201 in an unredacted form without exceeding the currently valid maximum sensitivity score for the Mobile Device 201, the Secure Mobile Migration Manager 205 instructs the Mobile Service Interface 203 to retransmit the data item in step 710. This will cause the data item to be transferred to the Mobile Device 201 in the process described in FIG. 3 since the decision made in step 310 will be that the data item can be transferred without violating the maximum sensitivity score. If it is determined in step 705 that there are no more unprocessed data items stored on the Mobile Device 201, then processing continues in step 711 by marking all data items as "not processed".

Figure 8:
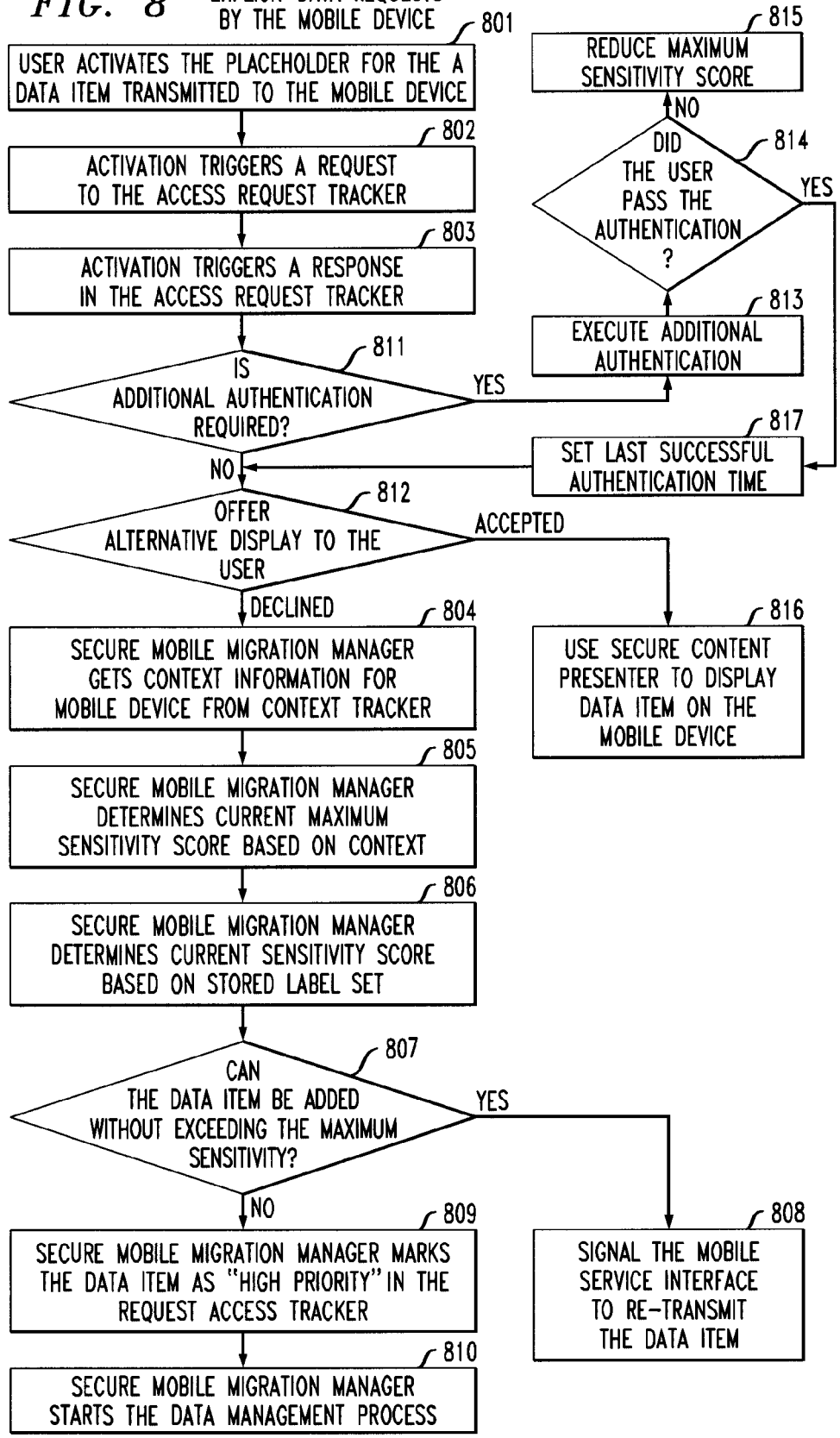
FIG. 8 is a diagram illustrating the process that transmits sensitive information to the Mobile Device based on explicit requests by the user according to an embodiment of the present invention.

FIG. 8 shows the mechanism used to signal an explicit request to view a sensitive data item. This allows explicit feedback by the user in case the process depicted in FIG. 6 does not automatically send all the data items as an unredacted version to the Mobile Device 201 that are needed by the user to the Mobile Device 201 without redaction.

In step 801, the user indicates the need for the unredacted data item on the Mobile Device 201. For example, the placeholder for the redacted data item can be displayed on the Mobile Device 201 as an element that can be clicked or otherwise activated by the user (e.g., a link or button in an HTML based placeholder). In another example, the user uses an App on the Mobile Device 201 to select a data item to be transferred to the Mobile Device 201 unredacted. In yet another example, the user uses a service on the Access Request Tracker 233 (e.g., servlet producing an HTML page that is displayed on the Mobile Device 201 listing all redacted data items with a link to click to request an unredacted version). Alternatively, the request for an unredacted version of a data item can be created by a module running on the Mobile Device 201 that gathers information about the user actions and it predicts the need for the data item in the near future.

The request for an unredacted version of a data item is translated on the Mobile Device 201 into a request towards the Access Request Tracker 233 in step 802. The request for an unredacted version of a data item triggers a response in the Access Request Tracker 233 (step 803), which in a preferred embodiment is realized by a web server responding to a HTTP request generated on the Mobile Device 201 as a response to activating the placeholder for the redacted data item. In other embodiments this may be implemented through other means known to the art to implement a request to a service from a Mobile Device 201.

In step 811, the Access Request Tracker 233 asks the Secure Mobile Migration Manager 205 if additional authentication is required to execute this request for a data item. The Secure Mobile Migration Manager 205 determines the current context and the history of sensitive information that was recently transferred to the Mobile Device 201 as recorded by the Device Sensitivity Tracker 236 and the User History Tracker 234 and transfers it to the Policy Decisions component 207. The Policy Decisions component 207 will use the Device Specific Policies 256 to decide if additional authorization is required based on the information passed in by the Secure Mobile Migration Manager 205. This prevents an attacker who has gained control over the Mobile Device 201 to quickly view large amounts of sensitive information on the Mobile Device 201 by activating several placeholders for redacted data items. This extends the guarantee of having a maximum amount of sensitive data on the Mobile Device 201 at any point in time to the guarantee of having a maximum amount of sensitive information accessible from the device over a certain period of time from the last successful authentication.

If the Access Request Tracker 233 decides in step 811 that additional authentication is required it will execute the additional authentication in step 813. In one embodiment the authentication will be implemented as a series of HTML forms displayed using the default mechanisms available on the Mobile Device 201. In another embodiment the authentication is implemented in the Secure Content Display 237 which can implement more complex authentication methods not realizable in HTML. In yet another embodiment additional authentication using biometrical identification methods like fingerprint scanning can be used if offered by the Mobile Device 201. In step 814, the Access Request Tracker 233 determines if the user successfully passed the required authentication.

If it is determines in step 814 that the user passed the additional authentication, the Secure Mobile Migration Manager 205 will set the time for the last successful authentication of the user for Mobile Device 201 in the Device Sensitivity Tracker 236 (step 817). This information is used to determine the recent sensitivity score for the Mobile Device 201 as described in FIG. 5.

If it is determined in step 814 that the user did not pass the authentication, then the Access Request Tracker 233 may in step 815 lower the current maximum sensitivity score for the Mobile Device 201 by reporting the failed authentication to the Context Tracker 235. The Context Tracker 235 will trigger the Sensitive Data Management Process described in FIG. 6. Based on the context information that the user failed the authentication the maximum sensitivity score is reduced to a lower value causing additional or all sensitive information to be removed from the device. In one embodiment, the Secure Content Presenter 209 may also use mechanisms available on the Mobile Device 201 to securely delete one or more sensitive data items on the Mobile Device 201. In another embodiment, the Secure Content Presenter 209 may cause a complete wipe of the Mobile Device 201 if the device supports that function. In yet another embodiment the Secure Content Presenter 209 may cause an immediate lock of the Mobile Device 201 if supported by the device.

If the Access Request Tracker 233 determines in step 811 that no additional authentication is required or processing continues after step 817 it may offer an alternate display to the user in step 812. The Access Request Tracker 233 displays a choice on the Mobile Device 201 to either view the requested data item using a separate display mechanism immediately without storing it on the Mobile Device 201 or to trigger the transfer of the data item to the Mobile Device 201 as soon as possible through the default mechanism implemented by the Mobile Service Interface 203. The user will choose based on his preference of viewing the document now or the need to have a copy on the Mobile Device 201 with the drawback that it can take some time if the Secure Mobile Migration Manager 205 needs to remove sensitive information from the Mobile Device 201 first to reduce the amount of sensitive information on the Mobile Device 201 to a level where the requested data item can be transferred to the Mobile Device 201 without exceeding the maximum sensitivity score for the Mobile Device 201.

If the user accepted the alternative display, the Access Request Tracker 233 uses the Secure Content Presenter 209 to display the requested data item on the Mobile Device 201 (step 816) after retrieving it from the Enterprise Server 204. In one embodiment this will be realized using HTML and image files that will be securely transferred onto the Mobile Device 201 and displayed using the default mechanisms available on the Mobile Device 201, e.g. a Web Browser. In another embodiment, the Secure Content Presenter 209 will send the data item to the Secure Content Display 237 which provides additional measures to ensure no temporary traces of the data item are left on the Mobile Device 201. If the user declined the alternative display in step 812 the Access Request Tracker 233 transfers the request to the Secure Mobile Migration Manager 205 to verify if the requested data item can be transferred immediately.

The first step by the Secure Mobile Migration Manager 205 is to get the current context for the Mobile Device 201 (step 804). The Secure Mobile Migration Manager 205 then determines the current maximum sensitivity score for the Mobile Device 201 based on the current context (step 805) and the sensitivity score for the data item based on the labels stored in the Device Sensitivity Tracker 236 when the data item was initially redacted before transmission to the Mobile Device 201 (step 806). The Secure Mobile Migration Manager 205 determines in step 807 if adding the data item to the Mobile Device 201 would exceed the current maximum sensitivity score, similar to the processing in steps 317 and 310. If adding the data item will not exceed the currently valid maximum sensitivity score for the Mobile Device 201 the Secure Mobile Migration Manager 205 will trigger the re-transmission of the data item to the Mobile Device 201 in step 808. This will trigger the process described in FIG. 3 and transfer the data item to the Mobile Device 201 since the decision in step 310 will not exceed the threshold. If transferring the data item would exceed the maximum sensitivity score for the Mobile Device 201, the Secure Mobile Migration Manager 205 will mark the data item as "high priority" at the Access Request Tracker 233 in step 809 and then trigger the Data Management Process (described in FIG. 6) in step 810. The combination of Data Management Process (FIG. 6) and the process described in FIG. 7 will then re-transmit the unmodified data item as soon as possible without violating the maximum sensitivity score for the Mobile Device 201.

Figure 9:
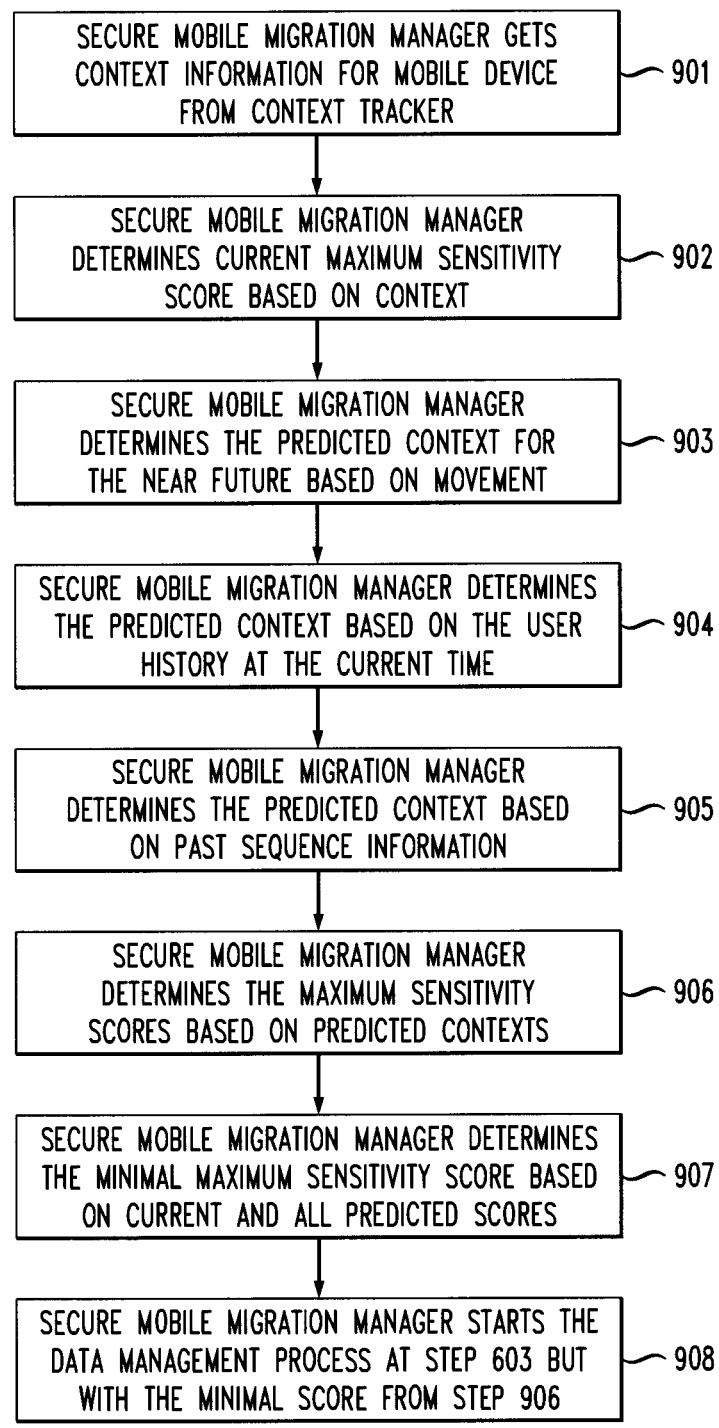
FIG. 9 is a diagram illustrating the process that predicts the maximum amount of sensitive information allowed on the device based on a prediction of the future context of the Mobile Device according to an embodiment of the present invention.

FIG. 9 describes the process used by the Secure Mobile Migration Manager to predict changes in the maximum sensitivity score and adjust the sensitive content accordingly. This allows proactive adjustment of sensitive information on the Mobile Device 201 to stay within the policy boundaries instead of lowering the amount of sensitive information on the Mobile Device 201 as a reaction to detecting a policy violation caused by a drop in the maximum sensitivity score below the current device sensitivity based as a result of a context change, e.g., a new location of the mobile device. This is especially relevant if making the predicted adjustments is possible over a different network (e.g., removing sensitive information through WiFi network instead of the cellular connection before the location change is detected and the Mobile Device is out of the WiFi network range) that allows faster or cheaper changes, or before the system enters a low-security area that may not provide adequate connectivity (e.g., leaving the coverage area of a wireless network provider).

The first step 901 consists of the Secure Mobile Migration Manager 205 acquiring the current context from the Context Tracker 235, followed by determining the currently valid maximum sensitivity score based on the current context in step 902. In step 903, the Secure Mobile Migration Manager 205 determines the predicted context in the near future (e.g., 1 minute from the current time) based on the current movement. This will predict the change of the geographic location and the resulting change in context based on relatively constant movements, e.g., driving in a car. In step 904, another context prediction is made by determining if a context is predictable in the near future by looking at the location at the same time in the past. This allows context prediction based on time based habits (e.g., the user of the Mobile Device 201 typically goes to lunch at 12:30 to a nearby public cafe or he typically connects the Mobile Device 201 to his privately owned laptop to synchronize data at 7:30 in the morning). In step 905, a context is predicted based on past context based sequence information that indicates a context change. This allows context prediction based on typical habits (e.g., 3 minutes after the Mobile Device 201 leaves proximity of a known Bluetooth device the user of the Mobile Device 201 leaves the office building, or right after a sudden acceleration of the Mobile Device 201 after a period without movement the user of the Mobile Device 201 changes his geographic location). In step 906, the Secure Mobile Migration Manager 205 determines the maximum sensitivity score for all predicted contexts using the Policy Decision Point 254 and the merged contexts. In step 907, the minimal score out of all individual maximum sensitivity scores calculated in step 906 is determined. If that minimal score is lower than the score determined in step 902, i.e., the Mobile Device 201 is predicted to change to a less secure context, then the Secure Mobile Migration Manager 205 will (in step 908) start the Data Management Process described in FIG. 6, but it will start at step 603 and use the predicted score determined in step 907. This will cause the removal of sensitive data items to ensure the total sensitivity score for the Mobile Device 201 is already lowered to the appropriate level before the Mobile Device 201 enters the less secure context. This process can be extended by utilizing other alternative methodologies to predict the Mobile Device location known in the art.

Turning now to FIG. 10, a block diagram is shown of an apparatus 1000 for implementing one or more of the methodologies presented herein. By way of example only, apparatus 1000 can serve as Enterprise Server 204 and can be configured to implement one or more of the steps of methodology 100 of FIG. 1 (as well as any of the other methodologies presented herein) for managing sensitive data on a mobile device.

Apparatus 1000 comprises a computer system 1010 and removable media 1050. Computer system 1010 comprises a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

As is known in the art, the methods and apparatus discussed herein may be distributed as an article of manufacture that itself comprises a machine-readable medium containing one or more programs which when executed implement embodiments of the present invention. For instance, when apparatus 1000 is configured to implement one or more of the steps of methodology 100 the machine-readable medium may contain a program configured to determine a sensitivity of a data item to be transferred to the mobile device; determine whether an aggregate sensitivity of data items already present on the mobile device plus the data item to be transferred exceeds a current threshold sensitivity value for the mobile device; and if the aggregate sensitivity exceeds the current threshold sensitivity value, employ measures to ensure the aggregate sensitivity remains below the current threshold sensitivity value for the mobile device, otherwise transfer the data item to the mobile device.

The machine-readable medium may be a recordable medium (e.g., floppy disks, hard drive, optical disks such as removable media 1050, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional video display 1040 is any type of video display suitable for interacting with a human user of apparatus 1000. Generally, video display 1040 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing sensitive data on a mobile device, comprising the steps of:
    determining a sensitivity of a data item to be transferred to the mobile device;
    determining whether an aggregate sensitivity of data items already present on the mobile device plus the data item to be transferred exceeds a current threshold sensitivity value for the mobile device; and
    if the aggregate sensitivity exceeds the current threshold sensitivity value, employing measures to ensure the aggregate sensitivity remains below the current threshold sensitivity value for the mobile device, otherwise transferring the data item to the mobile device.

2. The method of claim 1, wherein the mobile device can access resources on an enterprise server through a mobile network connector, and wherein the data item is transferred to the mobile device when the mobile device requests the data item from the enterprise server or when the enterprise server has a new data item available for the mobile device.

3. The method of claim 1, wherein the current threshold sensitivity value reflects a level of risk associated with the mobile device.

4. The method of claim 3, further comprising the step of:
    determining the level of risk associated with the mobile device based on one or more of a context to which the mobile device is currently associated, access control mechanisms provided by the mobile device and encryption mechanisms provided by the mobile device.

5. The method of claim 4, wherein the context to which the mobile device is currently associated is based on information gathered about the mobile device at a certain time interval.

6. The method of claim 5, wherein the information gathered about the mobile device comprise of one or more of sensory information from the mobile device, event information from the mobile device, and connection information from the mobile device.

7. The method of claim 5, wherein sensory information is comprised of one or more of location information for the mobile device, acceleration measurements of the mobile device, ambient light sensor information for the mobile device, proximity sensor information for the mobile device, and wireless devices currently within communication range of the mobile device.

8. The method of claim 6, wherein event information from the device comprises one of more of applications currently running on the mobile device, a number of failed logins reported by the mobile device, a number of successful logins reported by the mobile device.

9. The method of claim 6, wherein connection information is devices if any that are currently connected to the mobile device.

10. The method of claim 5, wherein the context is based on all information gathered about the mobile device during either a fixed number of time intervals or all time intervals since the location of the mobile device was changed by more than a distance threshold.

11. The method of claim 4, further comprising the step of:
    changing the threshold sensitivity value whenever the risk level associated with the mobile device changes.

12. The method of claim 11, further comprising the step of:
    replacing data items already on the mobile device with modified versions of the data items that were manipulated to have a lower sensitivity whenever the threshold sensitivity value decreases to ensure that the aggregate sensitivity remains below the threshold sensitivity value.

13. The method of claim 12, wherein the replaced data items are deemed not immediately needed by a user of the mobile device.

14. The method of claim 13, further comprising the step of determining that a data item is not immediately needed based on one or more of a last time the user accessed the data item, a number of times the user accessed the data item in a predetermined period of time, a context in which the user routinely accesses the data item or a similar data item and a relationship of the data item with other data items deemed not immediately needed by the user.

15. The method of claim 14, wherein two data items are considered similar if the distance measure of the two data items in a feature vector space is below a threshold.

16. The method of claim 12, further comprising the steps of:
    recording a list of the data items removed from the mobile device; and restoring one or more of the data items on the list when the aggregate sensitivity falls below the threshold sensitivity value as long as doing so does not exceed the threshold sensitivity value.

17. The method of claim 1, wherein the step of employing measures to ensure the aggregate sensitivity remains below the current threshold sensitivity value for the mobile device comprises the steps of:
manipulating the data items already present on the mobile device to maintain the aggregate sensitivity below the current threshold sensitivity value; and
transferring the data item to the mobile device.

18. The method of claim 1, wherein the step of employing measures to ensure the aggregate sensitivity remains below the current threshold sensitivity value for the mobile device comprises the steps of
redacting one or more portions of the data item to reduce the sensitivity of the data item resulting in a redacted version; and
transmitting the redacted version of the data item to the mobile device.

19. The method of claim 18, wherein the redacted version of the data item comprises a non-sensitive placeholder.

20. The method of claim 19, wherein the non-sensitive placeholder comprises a link to the data item to be transferred.

21. The method of claim 20, wherein a user of the mobile device can use the link to download the data item to the mobile device even when doing so would cause the aggregate sensitivity to exceed the current threshold sensitivity value for the mobile device, the method further comprising the steps of:
manipulating the data items already present on the mobile device to maintain the aggregate sensitivity below the current threshold sensitivity value; and
fulfilling the download request.

22. The method of claim 21, further comprising the steps of:
selecting a minimal set of the data items already present on the mobile device such that the sensitivity of the data item to be transferred is less than or equal to the sensitivities of the selected data items;
manipulating the selected data items such that when the download request is fulfilled the aggregate sensitivity is still maintained below the current threshold sensitivity value.

23. The method of claim 22, wherein the selected data items are deemed not immediately needed by a user of the mobile device.

24. The method of claim 23, further comprising the step of:
determining that a data item is not immediately needed based on one or more of the last time the user accessed the data item, a number of times the user accessed the data item in a predetermined period of time, a context in which the user routinely accesses the data item or a similar data item, and a relationship of this data item with other data items deemed not immediately needed by the user.

25. The method of claim 22, further comprising the steps of:
recording a list of the selected data items; and
restoring one or more of the selected data items on the list when the aggregate sensitivity falls below the threshold sensitivity value as long as doing so does not exceed the threshold sensitivity value.

26. The method of claim 25, wherein the data items that are restored are deemed immediately needed by a user of the mobile device.

27. The method of claim 26, further comprising the step of:
determining that a data item is immediately needed based on one or more of the last time the user accessed the data item, a number of times the user accessed the data item in a predetermined period of time, a context in which the user routinely accesses the data item or a similar data item, and a relationship of this data item with other data items deemed immediately needed by the user.

28. The method of claim 1, further comprising the steps of:
determining a current context of the mobile device;
predicting probable future contexts of the mobile device within a given time interval; and
determining threshold sensitivity values for all of the probable future contexts.

29. The method of claim 28, further comprising the steps of:
identifying a minimum threshold sensitivity value amongst all of the sensitivity values for the probable future contexts; and
replacing data items already on the mobile device with modified versions of the data items manipulated to have a lower sensitivity to maintain the aggregate sensitivity below the minimum threshold sensitivity value.

30. The method of claim 28, wherein the possible future contexts of the mobile device are predicted based on past actions of a user of the mobile device.

31. An apparatus for managing sensitive data on a mobile device the apparatus comprising:
a memory; and
at least one processor device, coupled to the memory, operative to:
determine a sensitivity of a data item to be transferred to the mobile device;
determine whether an aggregate sensitivity of data items already present on the mobile device plus the data item to be transferred exceeds a current threshold sensitivity value for the mobile device; and
if the aggregate sensitivity exceeds the current threshold sensitivity value, employ measures to ensure the aggregate sensitivity remains below the current threshold sensitivity value for the mobile device, otherwise transfer the data item to the mobile device.

32. An article of manufacture for managing sensitive data on a mobile device, comprising a non-transitory machine-readable recordable medium containing one or more programs which when executed implement the steps of:
determining a sensitivity of a data item to be transferred to the mobile device;
determining whether an aggregate sensitivity of data items already present on the mobile device plus the data item to be transferred exceeds a current threshold sensitivity value for the mobile device; and
if the aggregate sensitivity exceeds the current threshold sensitivity value, employing measures to ensure the aggregate sensitivity remains below the current threshold sensitivity value for the mobile device, otherwise transferring the data item to the mobile device.

* * * * *